US010692186B1

(12) United States Patent
Mercier et al.

(10) Patent No.: US 10,692,186 B1
(45) Date of Patent: Jun. 23, 2020

(54) BLENDING INSET IMAGES

(71) Applicant: Facebook Technologies, LLC, Menlo Park, CA (US)

(72) Inventors: Olivier Mercier, Redmond, WA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/224,695

(22) Filed: Dec. 18, 2018

(51) Int. Cl.
*G06T 3/40* (2006.01)
*G06T 15/20* (2011.01)
*G02B 27/01* (2006.01)
*G09G 5/30* (2006.01)
*G06F 3/01* (2006.01)

(52) U.S. Cl.
CPC .......... *G06T 3/4092* (2013.01); *G02B 27/017* (2013.01); *G06F 3/013* (2013.01); *G06T 15/205* (2013.01); *G09G 5/30* (2013.01); *G09G 2340/0407* (2013.01)

(58) Field of Classification Search
CPC .......... G06T 3/4092; G09G 2340/0407; G02B 27/017
See application file for complete search history.

(56) References Cited

U.S. PATENT DOCUMENTS

| | | | | |
|---|---|---|---|---|
| 4,348,186 A * | 9/1982 | Harvey | ............... | G09B 9/307 434/44 |
| 5,808,589 A * | 9/1998 | Fergason | ........... | G02B 27/0172 345/8 |
| 6,781,606 B2 * | 8/2004 | Jouppi | ................. | G06T 3/4038 318/568.12 |
| 7,081,870 B2 * | 7/2006 | Bronson | .............. | G02B 27/017 345/698 |
| 9,779,478 B1 * | 10/2017 | Wilson | .................... | G06F 3/013 |
| 10,054,797 B2 * | 8/2018 | Spitzer | .............. | G02B 27/0179 |
| 10,146,304 B2 * | 12/2018 | Werblin | ............... | G02B 27/017 |
| 2014/0146083 A1 * | 5/2014 | Yamaguchi | ........... | G06T 19/006 345/633 |
| 2018/0018943 A1 * | 1/2018 | Clarke | ................. | G02B 27/017 |

* cited by examiner

*Primary Examiner* — Ryan R Yang
(74) *Attorney, Agent, or Firm* — Freestone Intellectual Property Law PLLC; Aaron J. Visbeek

(57) ABSTRACT

A first image and a second image are presented to a user of a head mounted display (HMD) so that the first image and the second image are perceived as a combined image. The first image is inset into the second image and the first image may be a higher resolution image than the second image. The first image and the second image may be presented at different focal lengths and various techniques are utilized to gracefully blend the first image and the second image.

20 Claims, 25 Drawing Sheets

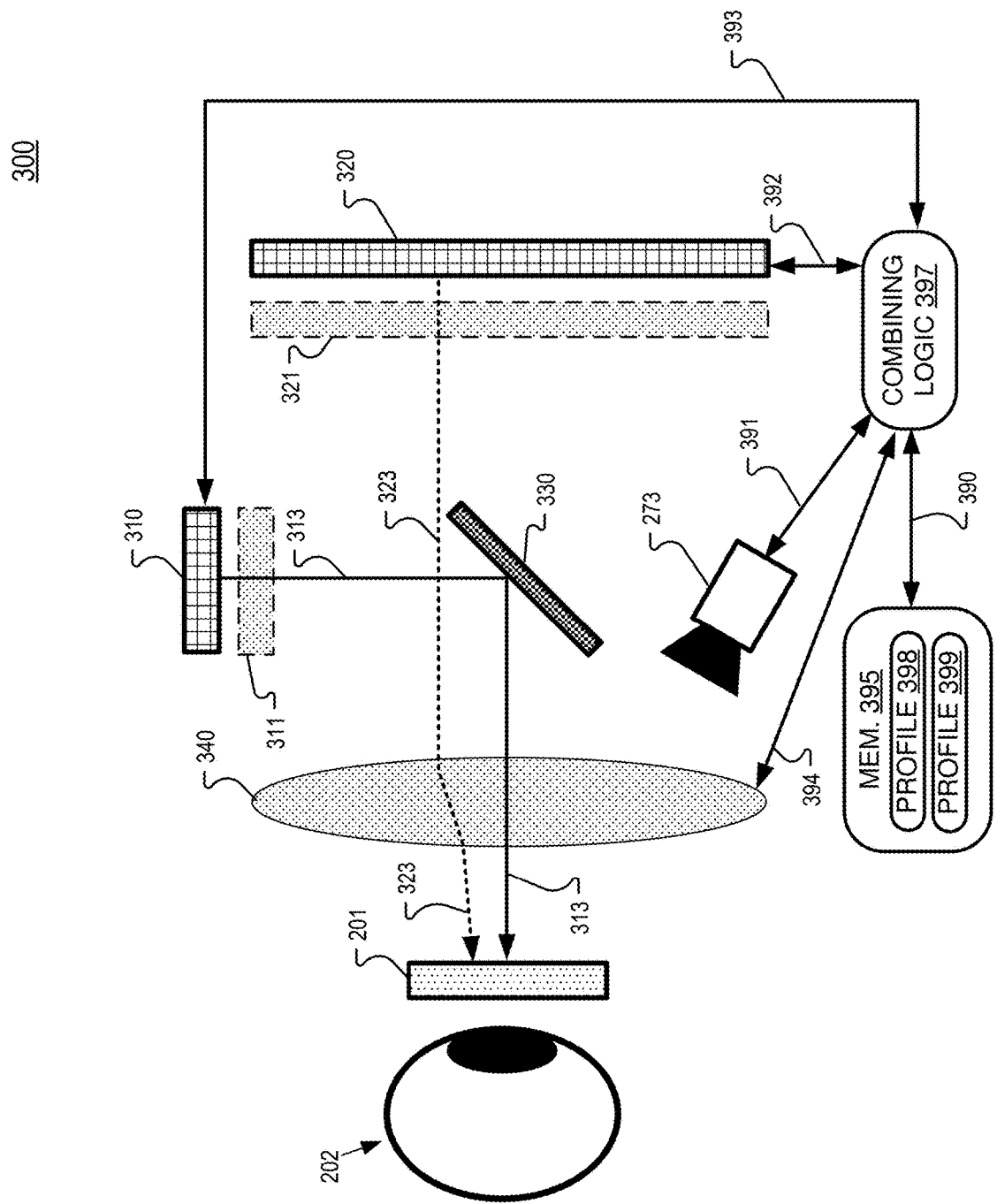

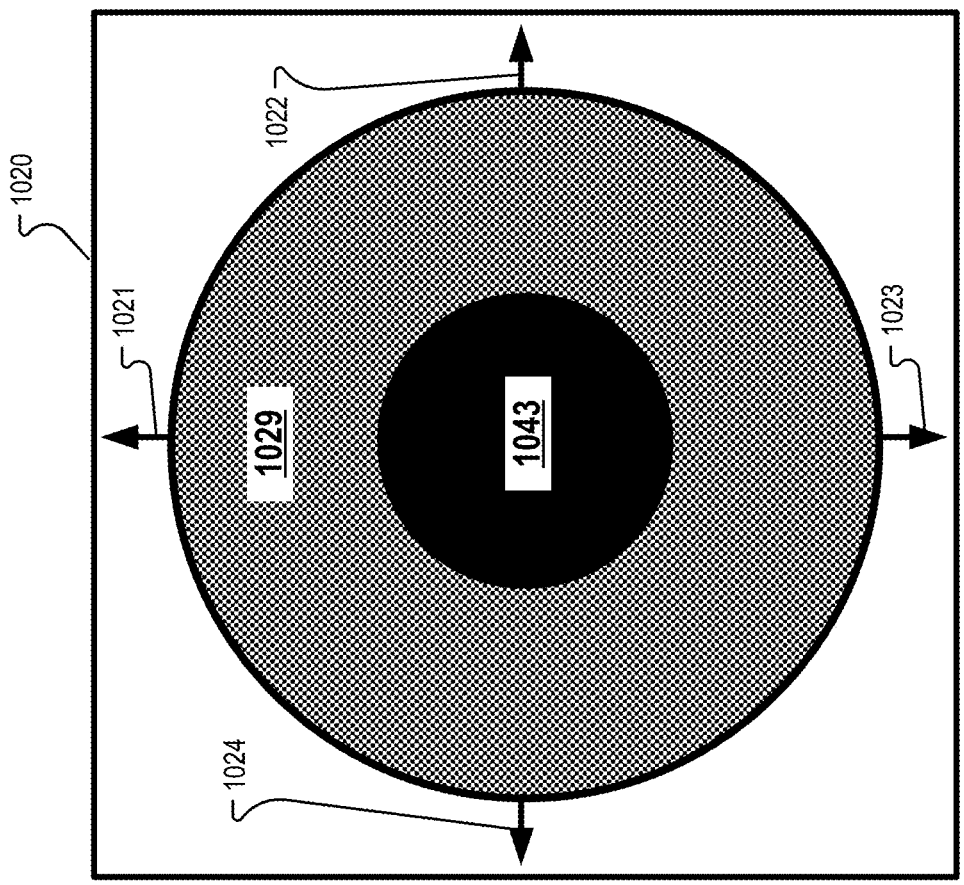
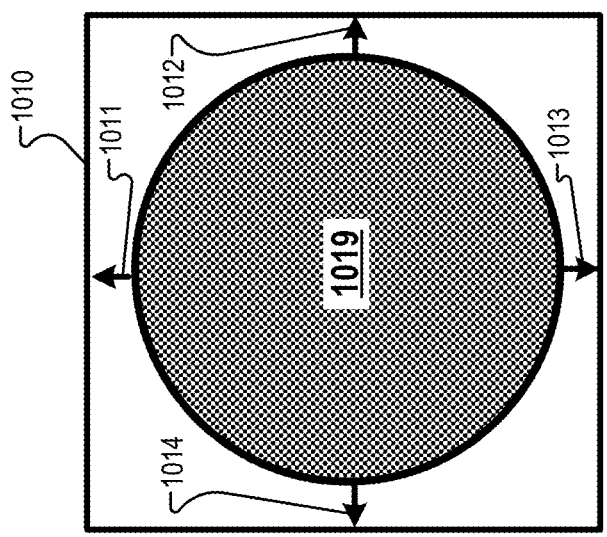
FIG. 10A

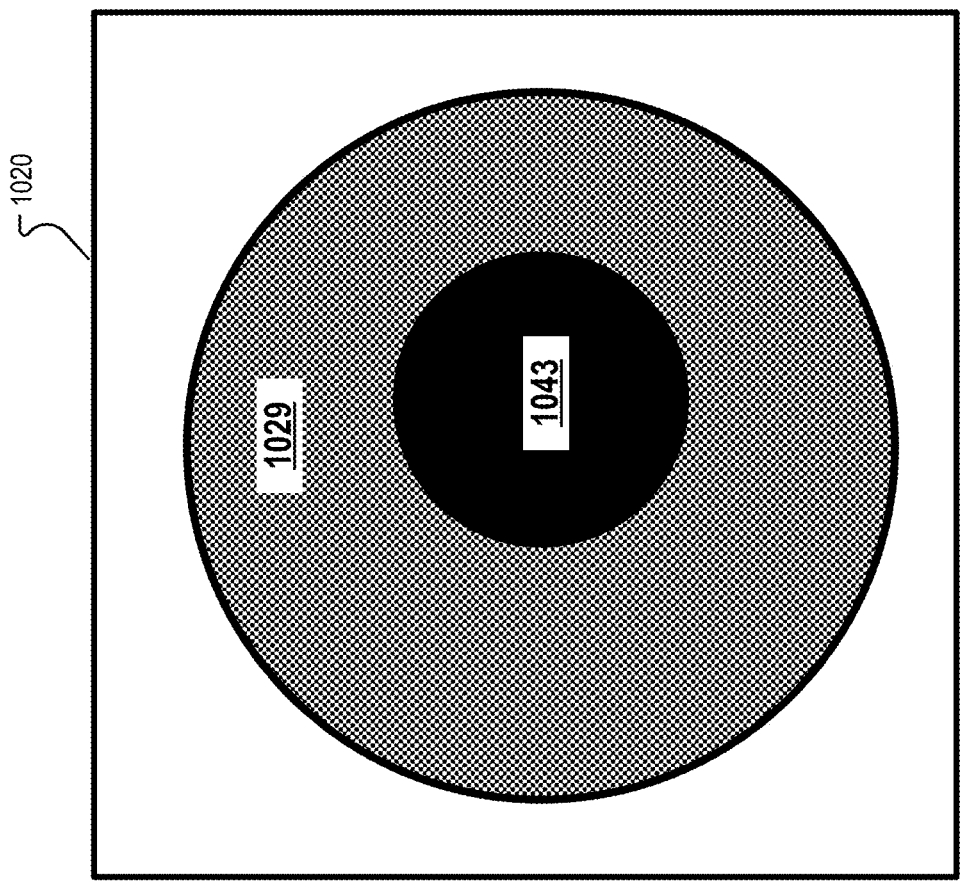
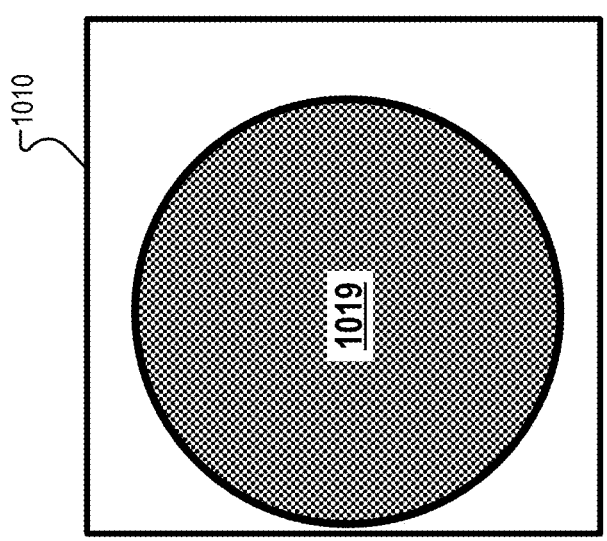
FIG. 10B

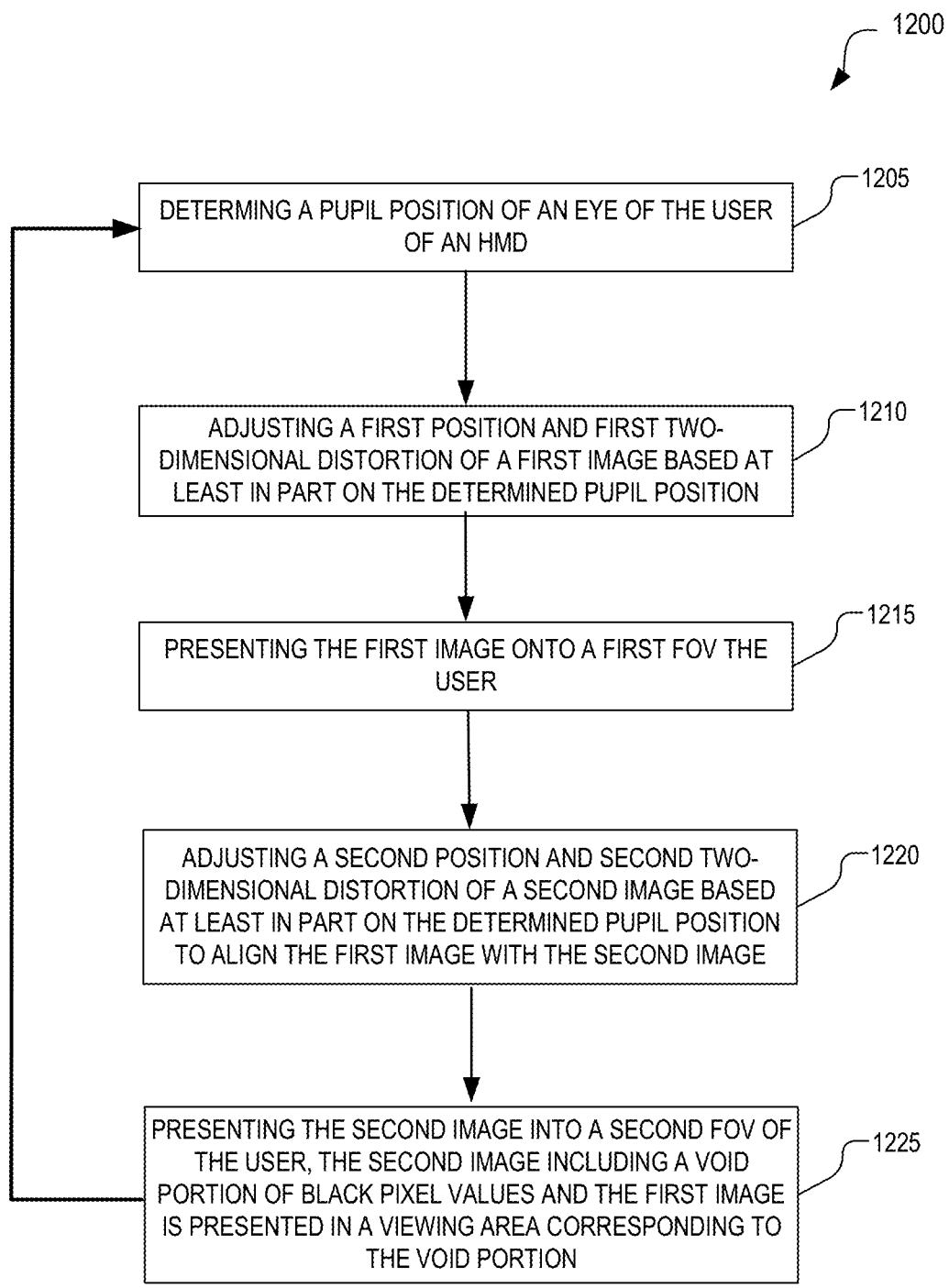

BLENDING INSET IMAGES

TECHNICAL FIELD

This disclosure relates generally to image processing, and in particular to image processing for presentation in a Head Mounted Display (HMD).

BACKGROUND INFORMATION

In certain contexts, display systems have been designed to include images that are blended together and presented to a user as a combined image that the user perceives as a single image. Presenting a combined image to a user may require blending the images together so that differences in the images are not readily apparent to a viewer. A Head Mounted Display (HMD) that includes a display system that blends images may present unique challenges in blending images.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 illustrates another example display system that presents a combined image to eye by driving a first high-resolution image onto a first display and driving a second image onto display, in accordance with an embodiment of the disclosure.

FIGS. 10A-10E illustrate example positions of images on display pixel arrays with an example display system, in accordance with an embodiment of the disclosure.

FIG. 12 illustrates a flow chart for an example process of presenting a combined image to a user of an HMD based at least in part on eye-tracking, in accordance with an embodiment of the disclosure.

DETAILED DESCRIPTION

Embodiments of systems, devices, and methods for blending inset images are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the disclosure include a display system for blending inset images. In some embodiments, a first image is a high-resolution image that is inset into a second image that is a lower resolution. The second image may provide a wider field of view (FOV) at a lower resolution while the high-resolution inset image may provide a higher resolution that may be in a middle of the user's field of view (FOV) where the user may look a majority of time.

In prior display systems, higher resolution images have been inset into lower resolution images. However, in the context of a head mounted display (HMD), pupil movement may impact the blending of the images. In particular, pupil movement may contribute to discontinuities or shearing between the two blended images for different pupil positions. Furthermore, the two images may be presented at different effective focal lengths that should be accounted for while blending two images into a combined image.

In embodiments of the disclosure, intensity profiles may be applied to outside boundaries of a first higher resolution image and inside boundaries of a second image to gracefully blend these images into a combined image. One or more resolution profiles may be applied to the first and second image to gracefully blend the high-resolution image with second image. The transitions of the intensity and/or resolution may be linear or non-linear to mask the transition between the two images in a combined image.

In embodiment of the disclosure, an eye-tracking system may be utilized to determine a pupil position of the eye of a wearer of an HMD. The position of a first and second image may be adjusted based on the determined pupil position to reduce discontinuities or shearing between the two images. These and other embodiments are described below with respect to FIGS. 1-12.

Figure 1:
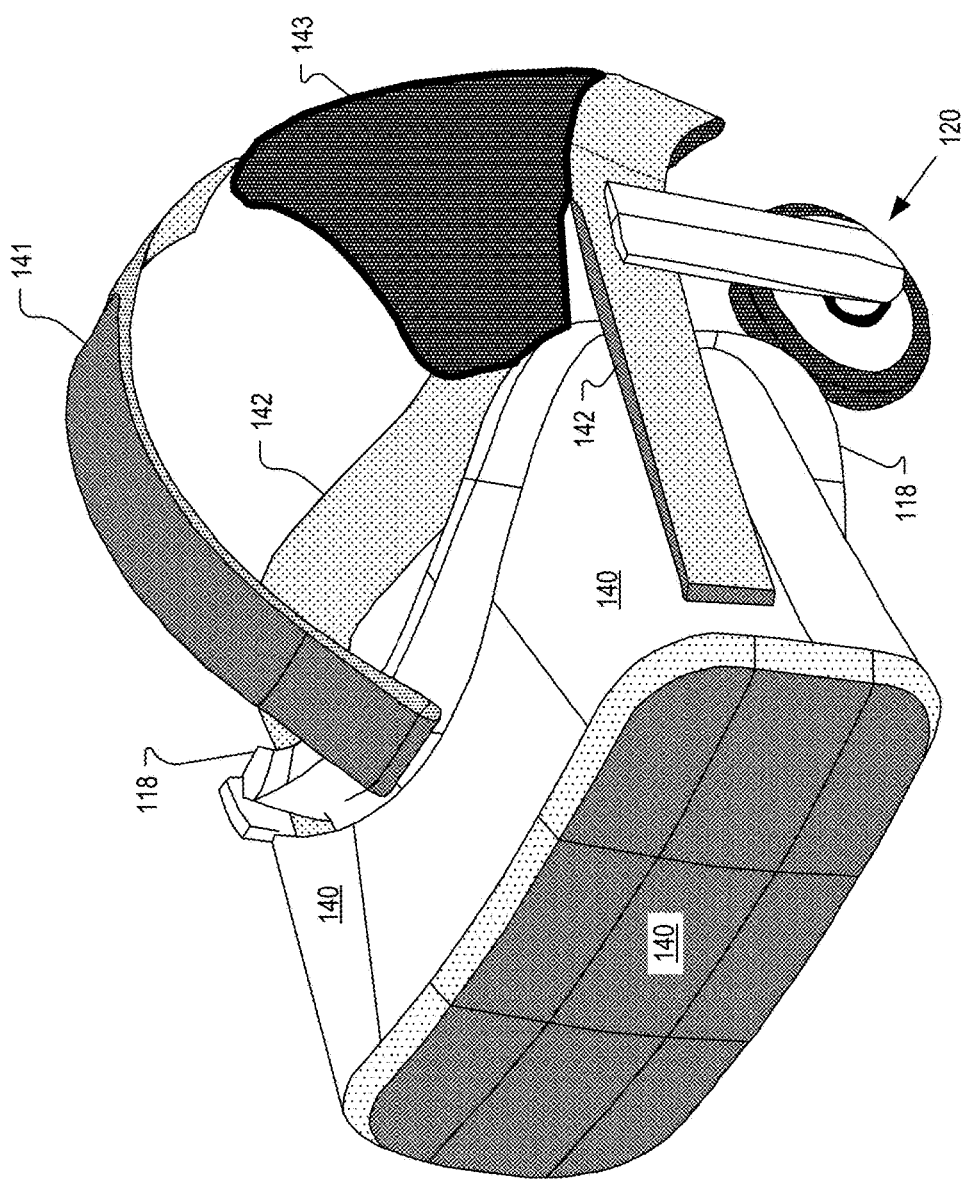
FIG. 1 illustrates an example head mounted display (HMD) that may include one or more displays that provide a combined image to a user of the HMD, in accordance with an embodiment of the disclosure.

FIG. 1 illustrates an example head mounted display (HMD) 100 that may include one or more displays that provide a combined image to a user of the HMD, in accordance with an embodiment of the disclosure. Example head mounted display (HMD) 100 includes a top structure 141, a rear securing structure 143, and a side structure 142 attached with a viewing structure 140 having a front rigid body 144. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display system having one or more displays for directing image light to a wearer of HMD 100. The display system may include one or more of an LCD, an organic light emitting diode (OLED) display, or micro-LED display for directing image light to a wearer of HMD 100. In some embodiments, an eye-tracking camera may be included in viewing structure 140 and positioned to capture image(s) of an eye of a user of HMD 100. Although the illustrated HMD 100 is configured for Virtual Reality (VR), principles and techniques described in this disclosure may also be applicable to Augmented Reality (AR) and other contexts where blending images to present a combined image is applicable.

Figure 2:
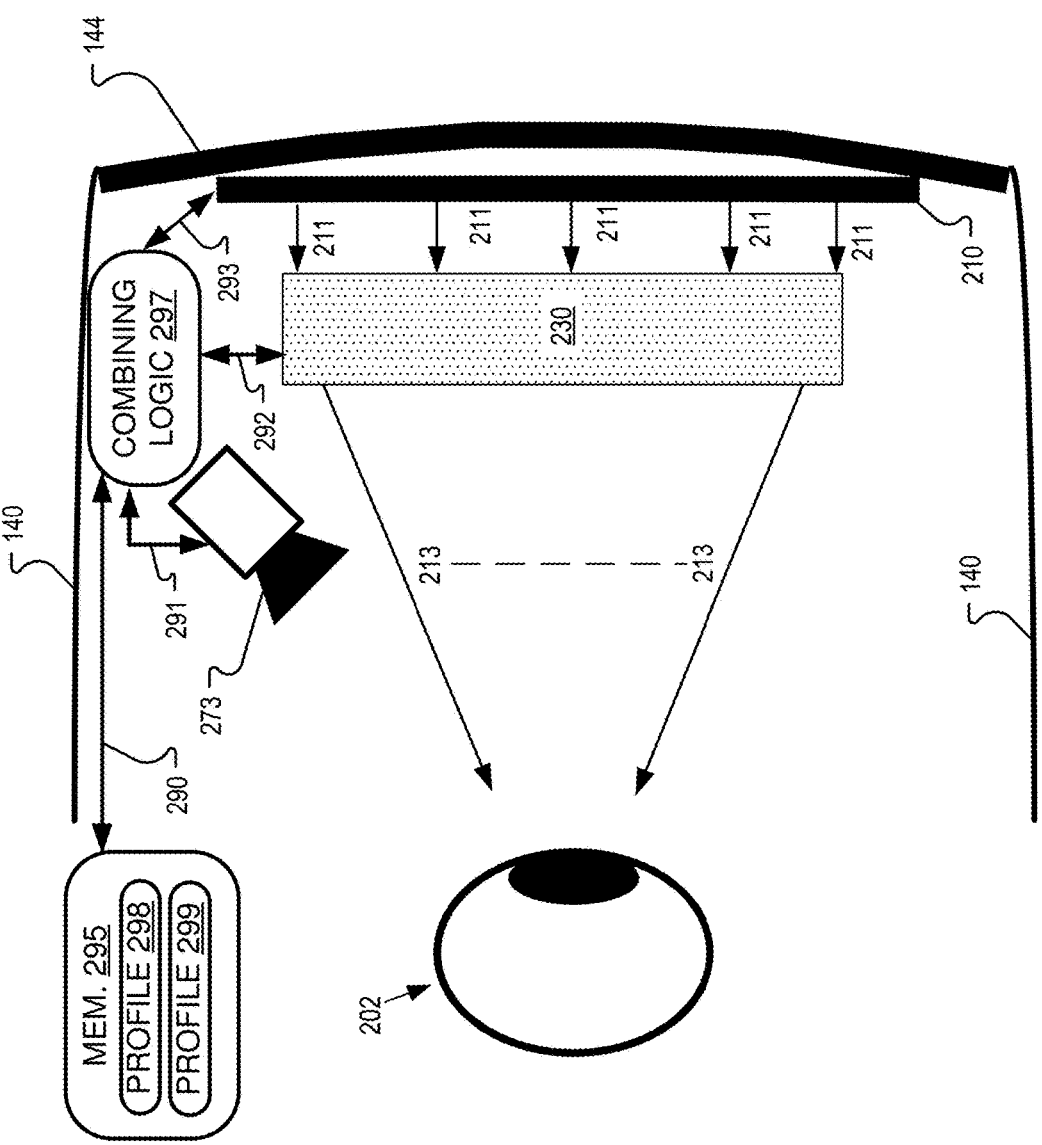
FIG. 2 illustrates a cut away view of an HMD that includes a display and an optical assembly configured to direct display light to an eyebox area, in accordance with an embodiment of the disclosure.

FIG. 2 illustrates a cut away view of an HMD 200 that includes a display 210 and an optical assembly 230 configured to direct display light 211 to an eyebox area, in accordance with an embodiment of the disclosure. Optical assembly 230 is positioned to receive the display light 211 and direct the display light 211 to eye 202 as image light 213. Optical assembly 230 may be configured to allow eye 202 of a wearer of HMD 100 to focus on a virtual image displayed by display 210. Although FIG. 2 only illustrates one eye 202, an HMD may have a display 210 (or a portion of a shared display) and an optical assembly 230 for each eye of the user of the HMD.

In the illustrated embodiment, HMD 200 includes an eye-tracking system 273 for determining a pupil position of eye 202. Eye-tracking system 273 may include infrared illuminators (e.g. LEDs) that illuminate the eye 202 with infrared light and an eye-tracking camera that captures infrared images of the eye 202. In the illustrated embodiment, combining logic 297 is coupled to eye-tracking system 273 by communication channel 291. Combining logic 297 is also configured to drive display 210 via communication channel 293.

Combining logic 297 may be configured to selectively drive optical assembly 230 to change an effective focal length of optical assembly 230, in some embodiments. Combining logic 297 may drive images onto display 210 in concert with selecting an effective focal length of optical assembly 230 so that first images on display 210 are presented at a first effective focal length and second images driven onto display 210 are presented at a second effective focal length. The first images may be blended with the second images to generate a combined image for presenting to eye 202. The first images and the second images may be driven time-sequentially onto display 210 at a frame rate high enough to blend the first and second images. In the illustrated embodiment, combining logic 297 is communicatively coupled to memory 295 by communication channel 290. Memory 295 stores various profiles 298 and 299 that are utilized by combining logic 297. In one embodiment, profile 298 characterizes a first optical path corresponding to a first effective focal length that a first high-resolution image is presented along and profile 299 characterizes a second optical path corresponding to a second effective focal length that the second image is presented along. FIG. 2 is merely one example of a display system that may present a combined image that includes a first high-resolution image blended with a second image.

FIG. 3 illustrates another example display system 300 that presents a combined image to eye 202 by driving a first high-resolution image onto a first display 310 and driving a second image onto display 320, in accordance with an embodiment of the disclosure. A reflective element 330 directs display light emitted by first display 310 along optical path 313 to eyebox area 201. When element 330 is fully reflective, it may obstruct display light emitted by a middle portion of second display 320 from becoming incident on eye 202. The middle portion of display 320 may be driven to black pixel values, in some embodiments, since the display light from pixels in the middle of display 320 will be obstructed by reflective element 330. Display 310 may be of a higher resolution than display 320. Optical assembly 340 is positioned to receive the display light from first display 310 (via element 330) and receive display light from second display 320 and direct the display light to eye 202 as image light. Optical assembly 340 may be configured to allow eye 202 of a wearer of an HMD to focus on a combined virtual image that includes images presented by first display 310 and second display 320. Combining logic 397 may be coupled to selectively drive optical assembly 340 to change an effective focal length of optical assembly (via communication channel 394) in some embodiments. Additional optics 311 may be disposed between display 310 and reflective element 330, in some embodiments, and additional optics 321 may be disposed between optical assembly 340 and display 320, in some embodiments.

Reflective element 330 may be a circle or a rectangle. Reflective element 330 may be a reflective lens that imparts optical power to display light received from first display 310, in some embodiments. An image displayed on first display 310 may be presented to a user at a first effective focal length that is different from a second effective focal length that an image driven onto second display 320 is presented. The first effective focal length associated with optical path 313 may be greater than the second effective focal length associated with optical path 323. In some embodiments, first display 310 may be disposed a longer or shorter distance from reflective element 330 than second display 320 is positioned from reflective element 330. Therefore, an image displayed on first display 310 may be presented to a user at a first effective focal length that is different from a second effective focal length that an image driven onto second display 320 is presented.

Display system 300 may include an eye-tracking system 273 for determining a pupil position of eye 202. Eye-tracking system 273 may include infrared illuminators (e.g. LEDs) that illuminate the eye 202 with infrared light and an eye-tracking camera that captures infrared images of the eye 202. In the illustrated embodiment, combining logic 397 is coupled to eye-tracking system 273 by communication channel 391. Combining logic 397 is also configured to drive first images onto first display 310 via communication channel 393 and configured to drive second images onto second display 320 via communication channel 392.

In the illustrated embodiment, combining logic 397 is communicatively coupled to memory 395 by communication channel 390. Memory 395 stores various profiles 398 and 399 that are utilized by combining logic 397. In one embodiment, profile 398 characterizes a first optical path (e.g. optical path 313) corresponding to a first high-resolution image being presented at a first effective focal length and profile 399 characterizes a second optical path (e.g. optical path 323) corresponding to a second image being presented at a second effective focal length. As described above, FIGS. 2 and 3 are merely examples of a display system that may present a combined image that includes a first high-resolution image blended with a second image and other display systems may also be capable of presenting a combined image having a first high-resolution image blended with a second image.

Figure 4A:
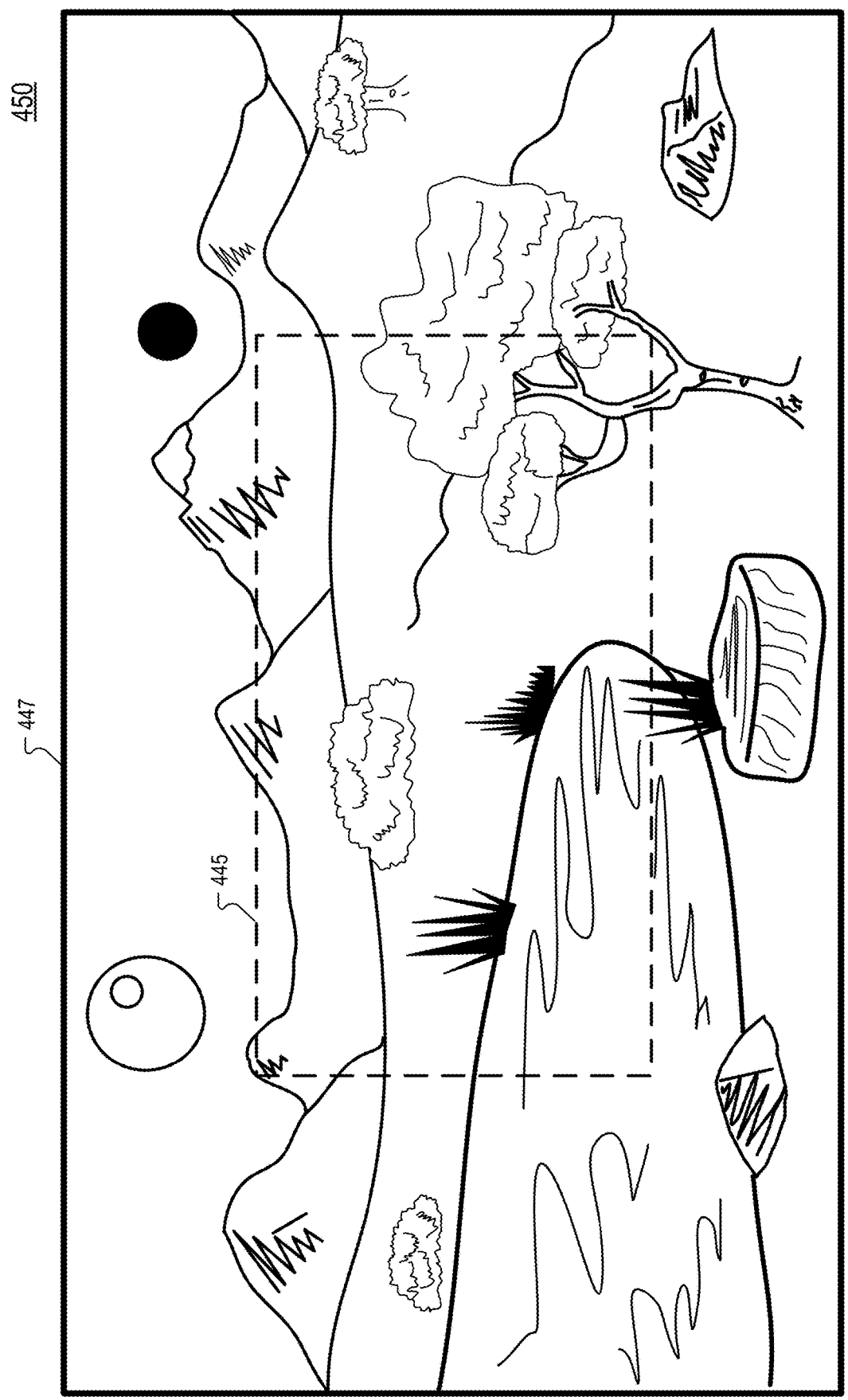
FIGS. 4A-4G illustrate examples of a first image and second image that may be perceived as a combined image to users of an HMD, in accordance with an embodiment of the disclosure.

FIGS. 4A-4G illustrate examples of a first image and a second image that may be perceived as a combined image to users of an HMD, in accordance with embodiments of the disclosure. FIG. 4A illustrates an example rectangle-shaped combined image 450 for presenting to a user of an HMD. Those skilled in the art understand that although rectangular images are illustrated in FIGS. 4A-4G, non-rectangular images corresponding to non-rectangular displays or FOVs limited by rounded lens apertures may also be utilized. Combined image 450 includes a first image 445 and a second image 447. Image 445 and image 447 may be presented sequentially to the users at a high frame rate so that the user perceives the sequential presentation of image 445 with image 447 as combined image 450. In other embodiments, image 445 and image 447 may be presented at the same time and/or in overlapping time periods so the presentation of images 445 and 447 as perceived as a combined image 450. In FIG. 4A, image 445 corresponds with a first field of view (FOV) and image 447 corresponds with a second FOV that is larger than the first FOV.

Figure 4B:
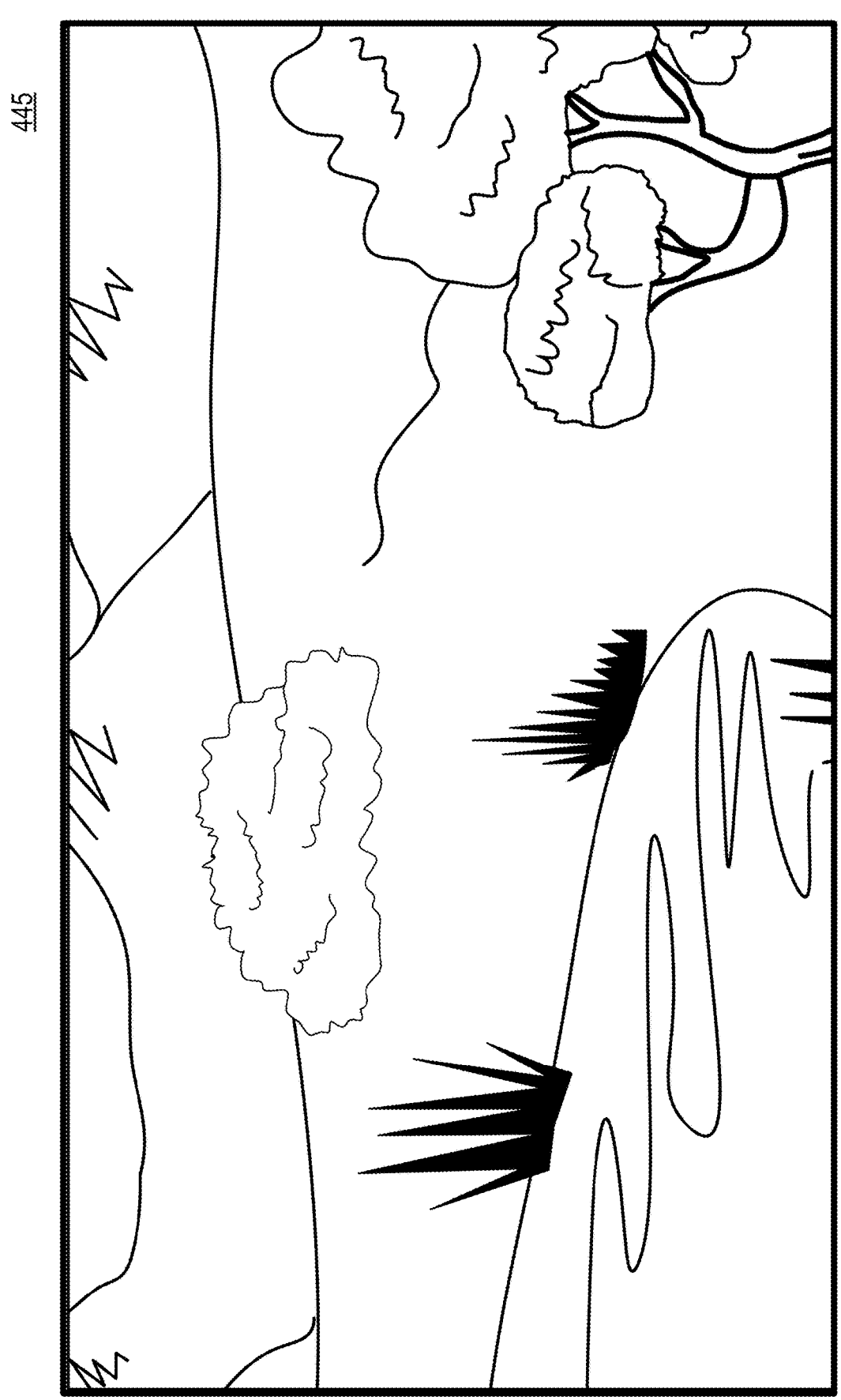
Figure 4C:
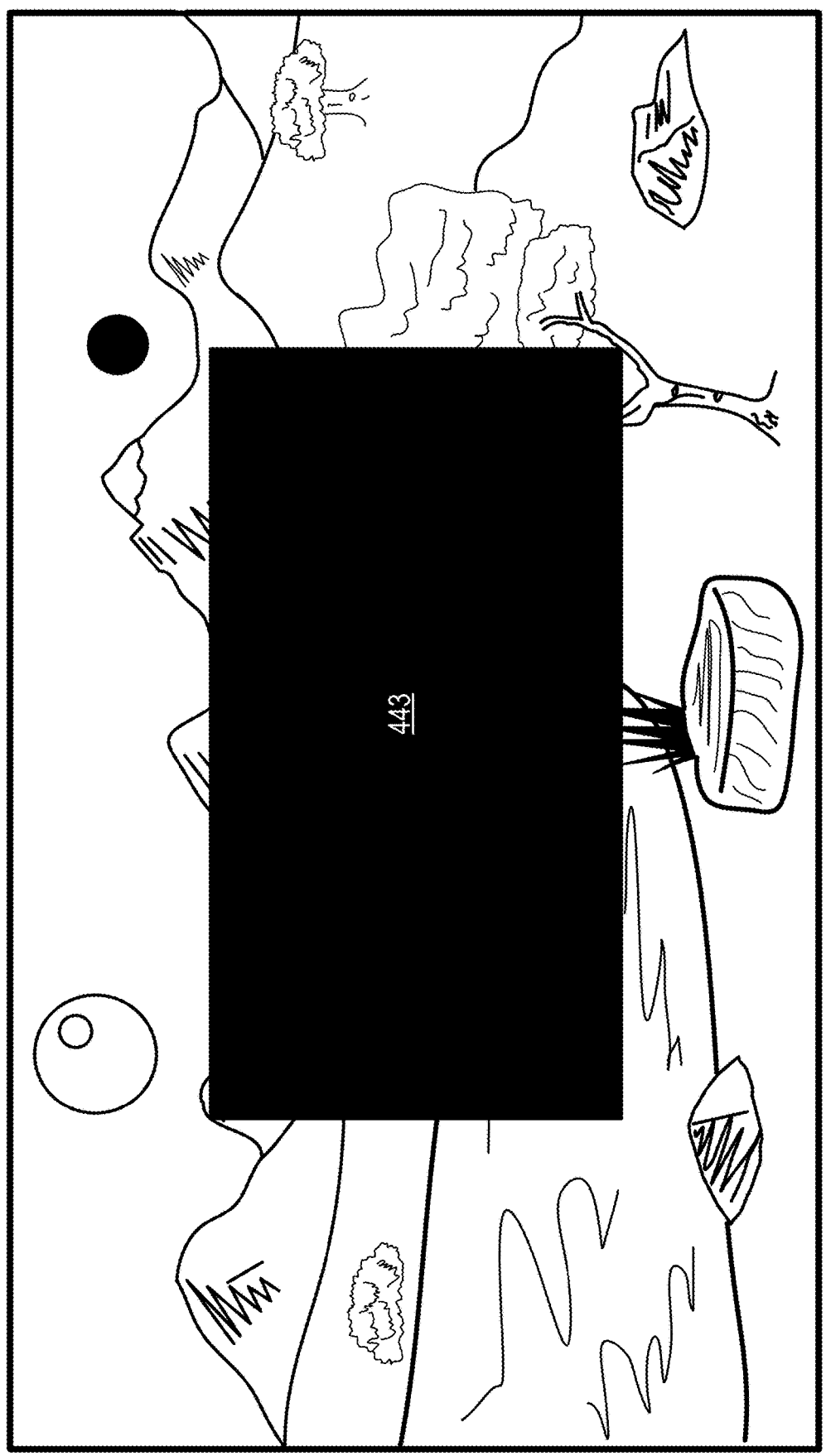

FIG. 4B illustrates first image 445 that may be driven onto a display (e.g. display 310) as a high-resolution image. FIG. 4C illustrates a second image 447 that may be driven onto a display (e.g. display 320). Notably, image 447 may have a void portion 443 of black pixels and the first image 445 may be presented in viewing area that corresponds with void portion 443. A portion of the pixels in the display may be driven to have black pixel values to generate void 443. This may prevent the display light that would be emitted in void 443 from intermixing with the display light from image 445 that will be presented as a higher resolution image.

Figure 4D:
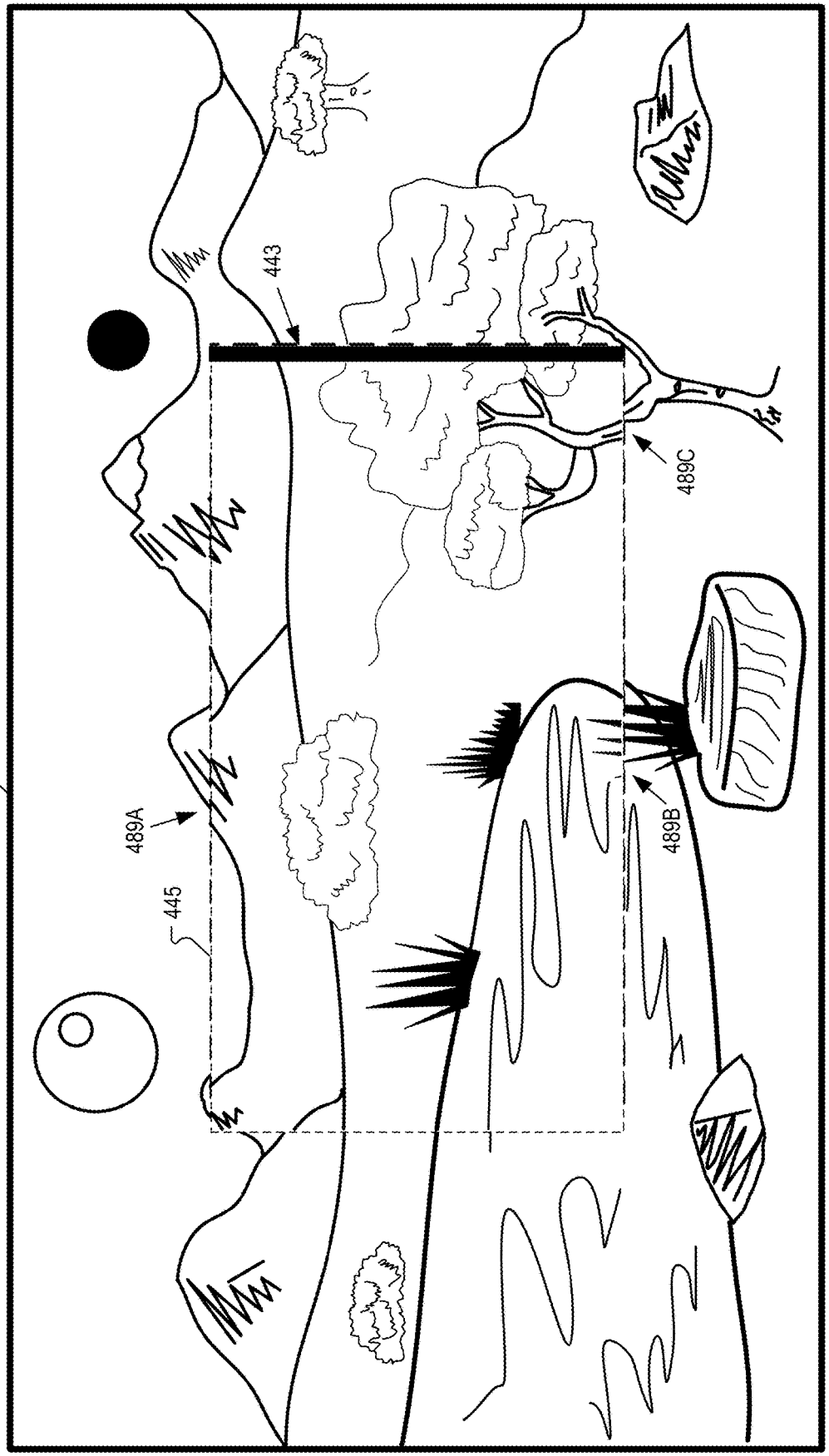

FIG. 4D illustrates a combined image 451 that includes discontinuities and shearing between image 445 and 447. In particular, discontinuities and shearing identified by reference elements 489A, 489B, and 489C show that the lines illustrating the mountains, trees, and reeds are misaligned between the high-resolution inset image 445 and the second image 447. Noticeably, the misalignment may also cause a user to see a portion of the void region 443 of image 447.

In virtual reality (VR) experience, the concepts of "presence" and "immersion" are important to enhance the experience. Consequently, image misalignments from discontinuities and shearing may degrade the experience. Furthermore, even when misalignment between the images is not readily apparent, a graceful blending of a high-resolution inset image with a lower resolution second image that provides a greater FOV may enhance the user experience.

Figure 4E:
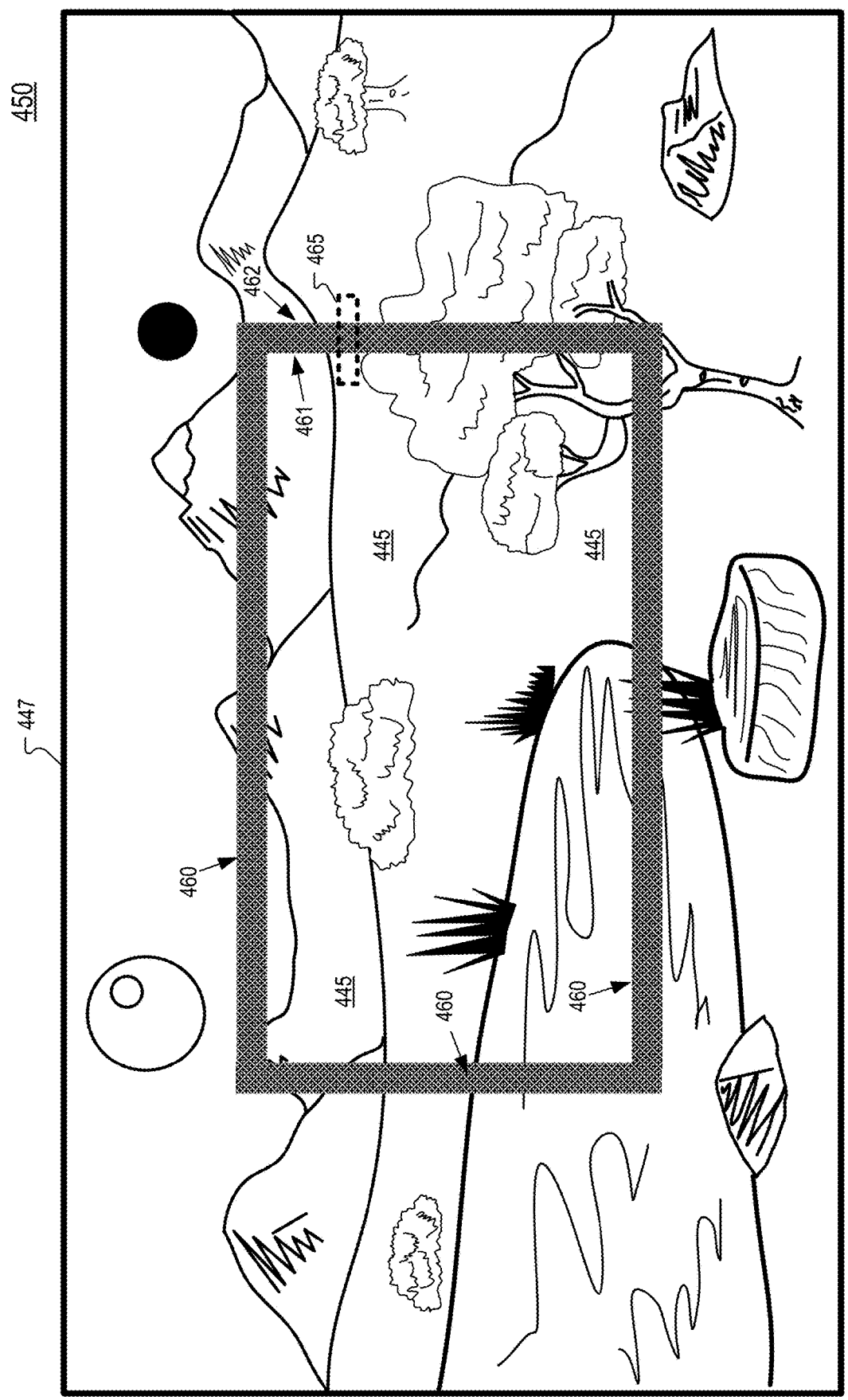
Figure 4F:
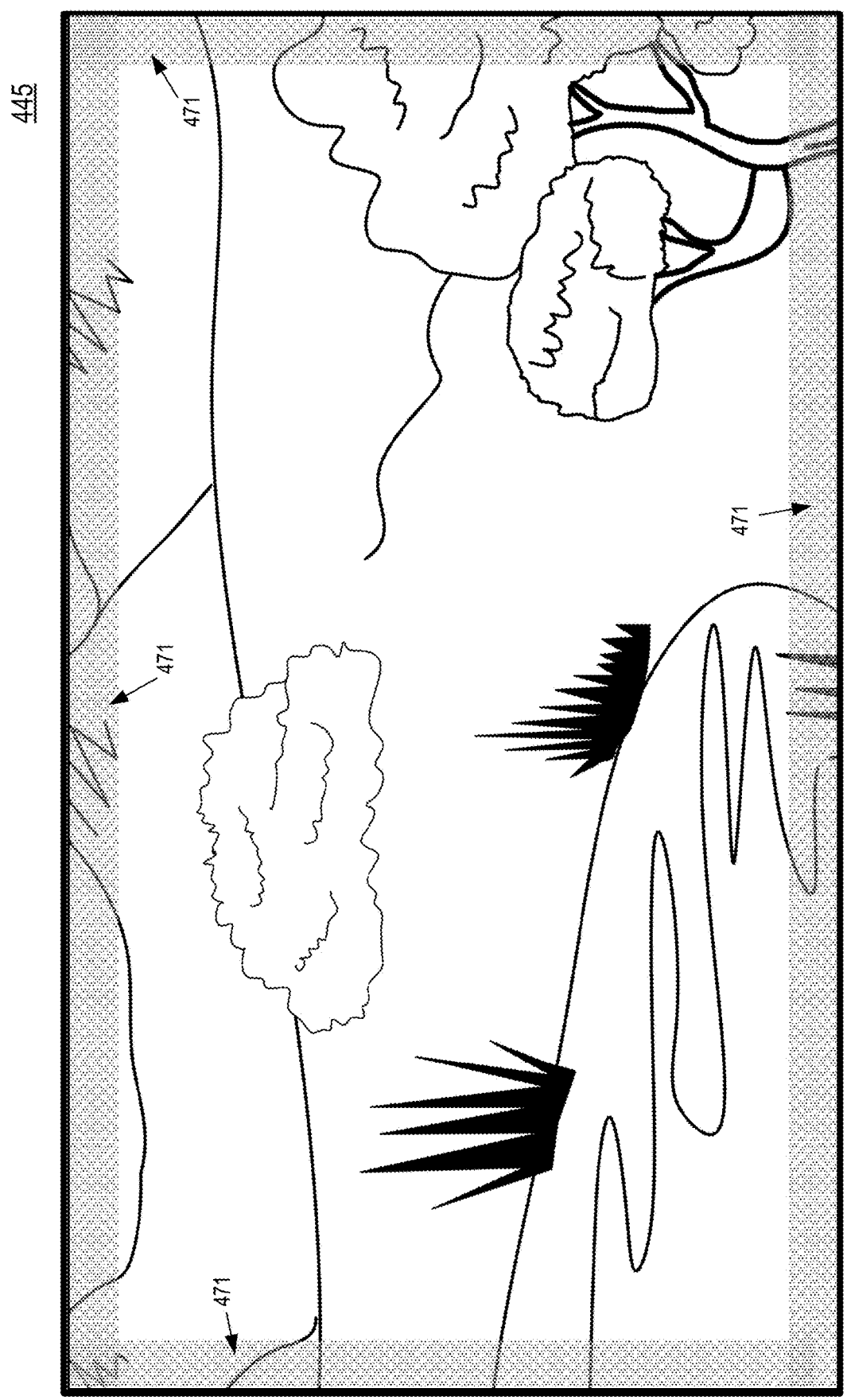
Figure 4G:
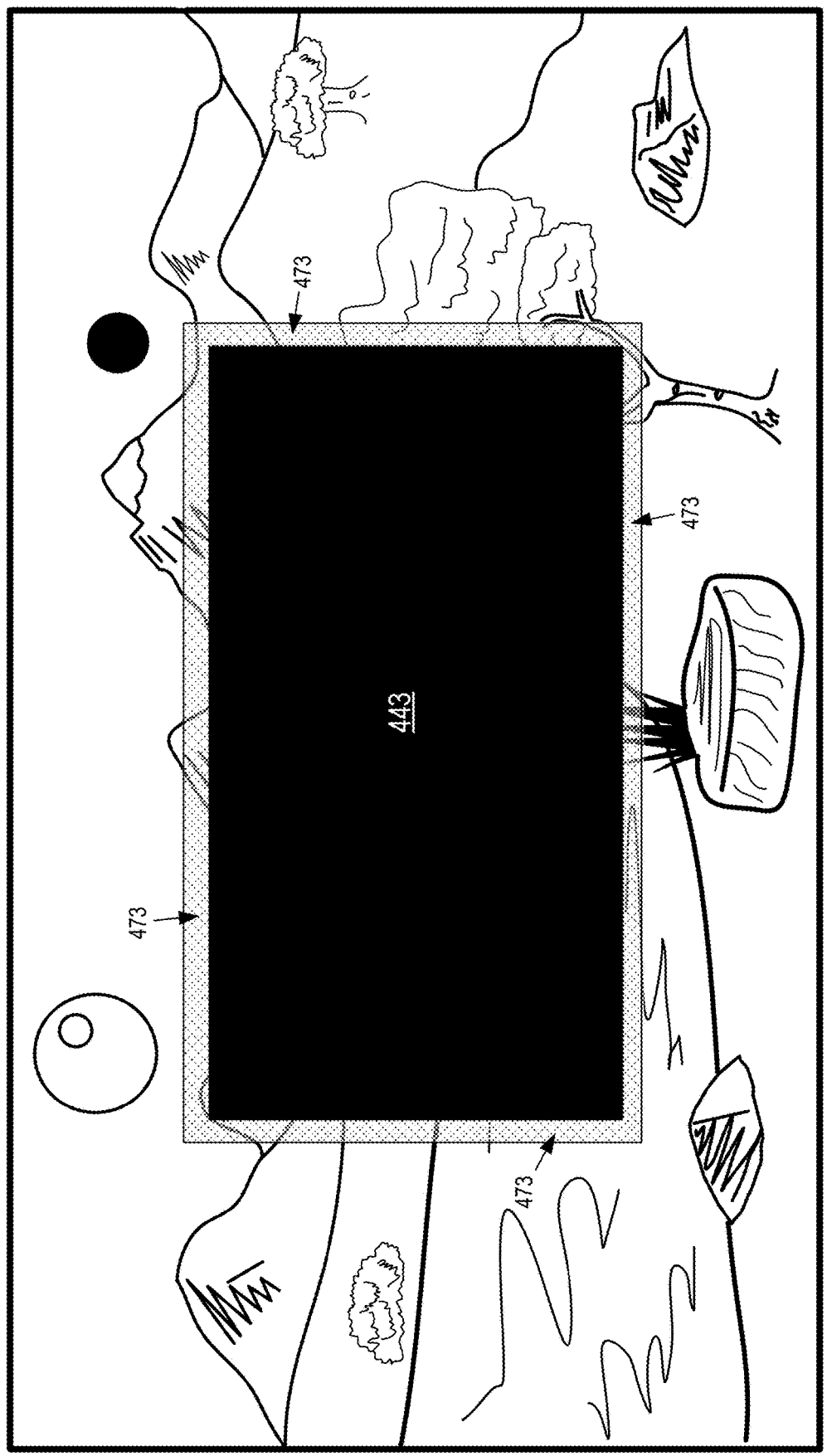

FIG. 4E illustrates a transition zone 460 overlaying the boundaries of first image 445 and second image 447, in accordance with embodiments of the disclosure. Transition zone 460 extends from a first transition edge 461 to a second transition edge 462. FIG. 4F illustrates an example first transition zone 471 on outside boundaries of first image 445. FIG. 4G illustrates an example second transition zone 473 on inside boundaries of the second image 447. First transition zone 471 may be disposed directly over second transition zone 473 so that the first transition zone 471 and second transition zone 473 occupy the same field of view of the user, in some embodiments. The width of the illustrated transition zones may vary from the example illustrations, in different embodiments.

Figure 5:
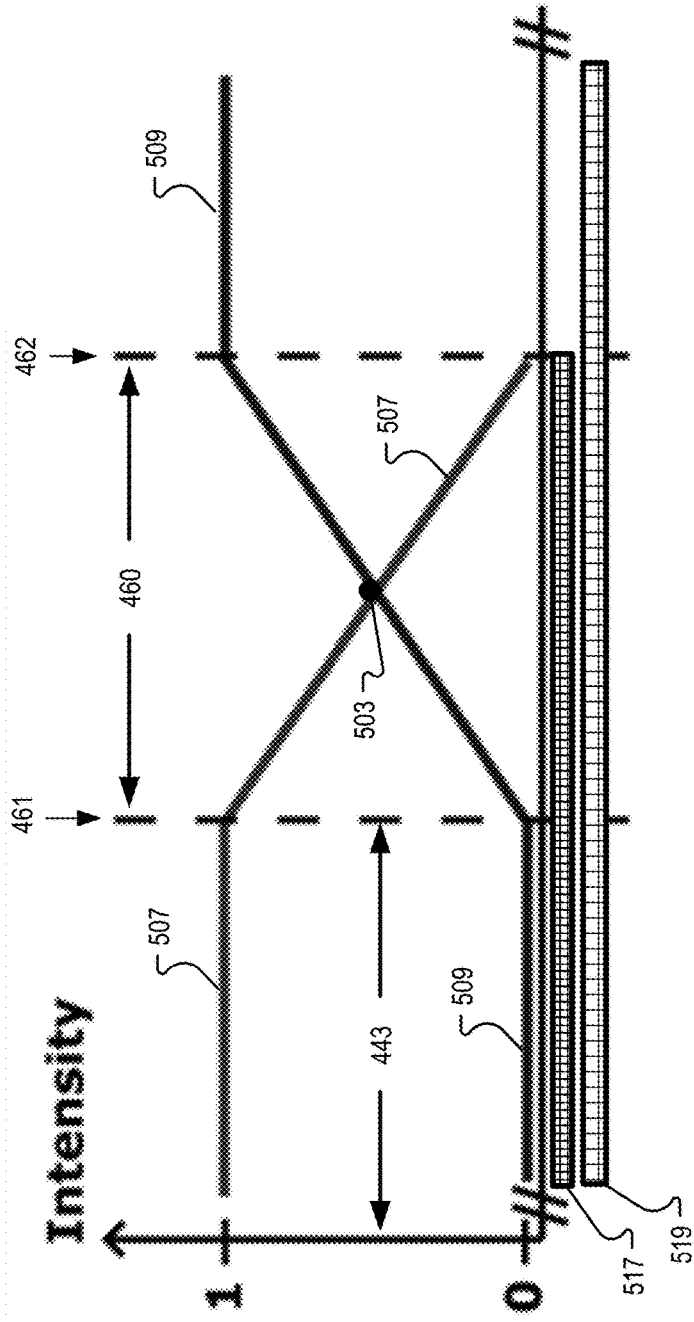
FIG. 5 illustrates example intensity profiles of a first and second image within a transition zone, in accordance with an embodiment of the disclosure.

FIG. 5 illustrates example intensity profiles of a first and second image within a transition zone 460, in accordance with embodiments of the disclosure. FIG. 5 illustrates a side view within view 465 of FIG. 4E where reference element 517 represents a FOV of the first image 445 overlapping the FOV of the second image 447 (represented by reference element 519). Chart 500 illustrates a first intensity profile 507 that may be applied to the first image 445 and a second intensity profile 509 that may be applied to the second image 447. In particular, the portion of first intensity profile 507 inside transition zone 460 may be applied to the outside boundaries of first image 445. Similarly, the portion of second intensity 509 inside transition zone may be applied to the inside boundaries of the second image 447 to gracefully blend the images to be perceived as a combined image 450.

For second intensity profile 509 in chart 500, the intensity is zero within void region 443 and increases linearly at the first transition edge 461 until reaching the second transition edge 462 and the intensity value of one (e.g. 100% illuminated). For first intensity profile 507, the intensity value is one over void region 443 and decreases linearly at the first transition edge 461 until reaching the second transition edge 462 and an intensity value of zero. In the illustrated embodiment, the intensity value of profile 507 and 509 is the same 50% into the transition zone 460, as notated by intersection 503.

Figure 6:
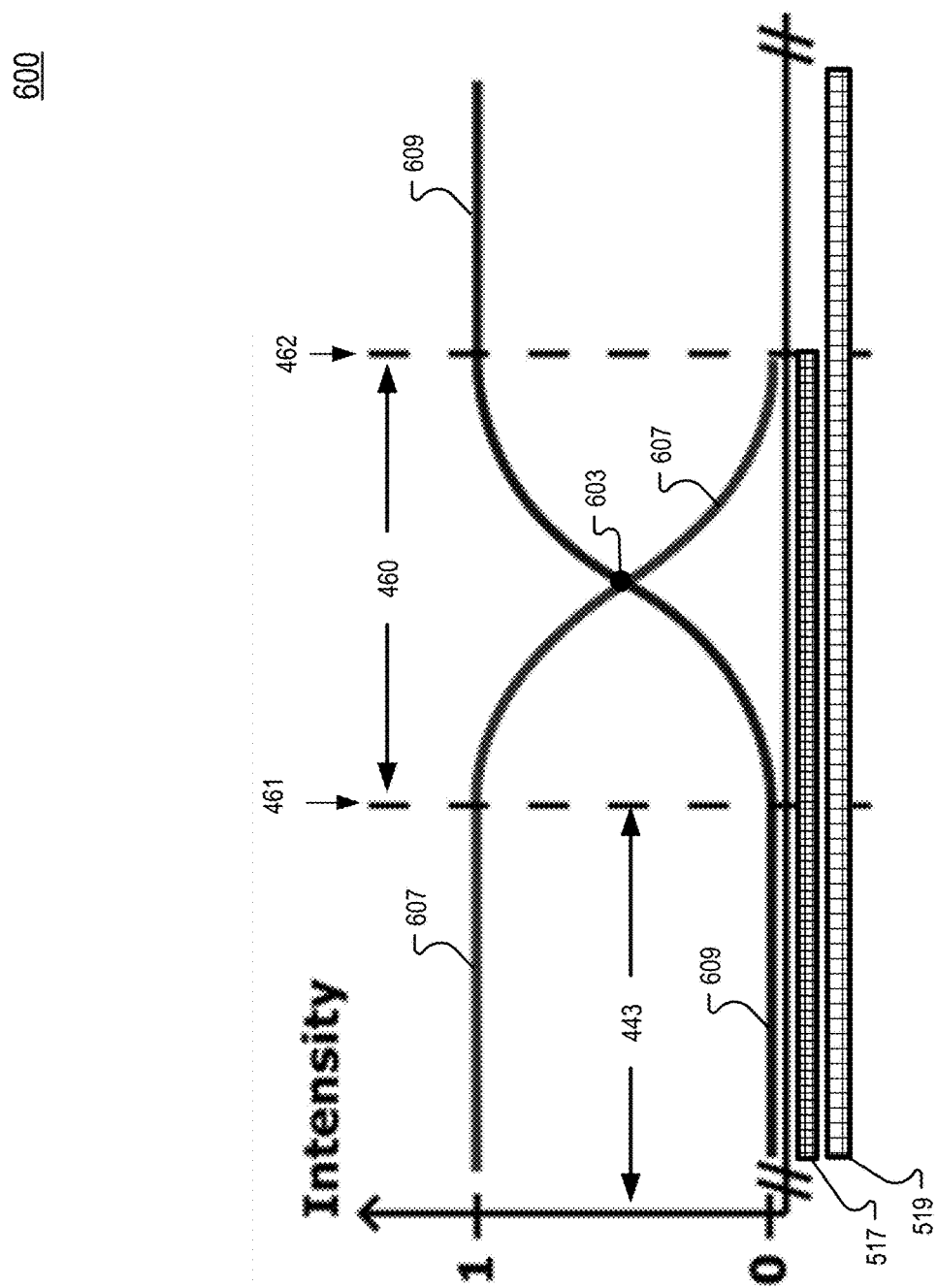
FIG. 6 illustrates example non-linear intensity profiles of a first and second image within a transition zone, in accordance with an embodiment of the disclosure.

FIG. 6 illustrates example non-linear intensity profiles of a first and a second image within a transition zone 460, in accordance with embodiments of the disclosure. Chart 600 illustrates a first intensity profile 607 that may be applied to the first image 445 and a second intensity profile 609 that may be applied to the second image 447. In chart 600, intensity profiles 607 and 609 differ from profiles 507 and 509 in that the increase and decrease of the intensity values are non-linear within transition zone 460. Yet, the intensity value of profile 607 and 609 is the same 50% into the transition zone 460, as notated by intersection 603.

Figure 7:
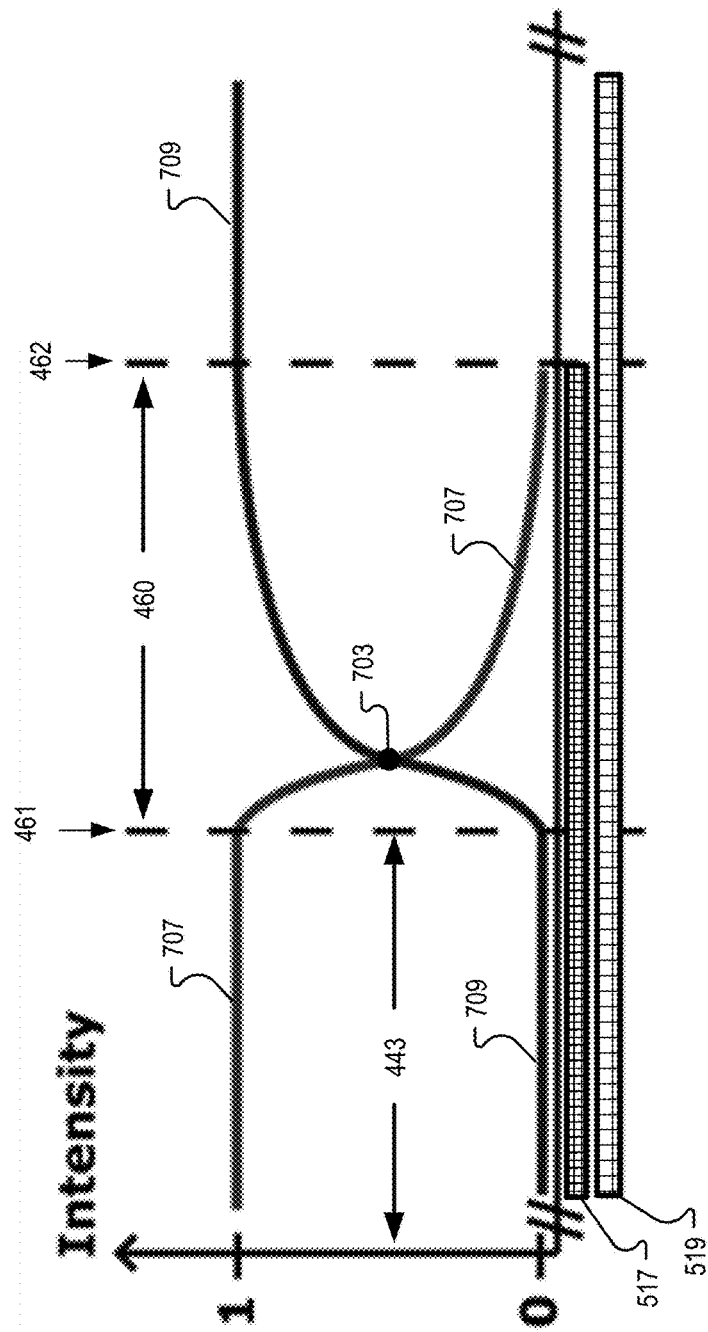
FIG. 7 illustrates example non-linear intensity profiles of a first and second image within a transition zone, in accordance with an embodiment of the disclosure.

FIG. 7 illustrates example non-linear intensity profiles of a first and a second image within a transition zone 460, in accordance with embodiments of the disclosure. Chart 700 illustrates a first intensity profile 707 that may be applied to the first image 445 and a second intensity profile 709 that may be applied to the second image 447. In chart 700, intensity profiles 707 and 709 differ from profiles 607 and 609 in that the intensity value of profile 707 and 709 are no longer symmetric about crossover point 703. In the illustrated profile, the crossover point 703 is closer to first transition edge 461 than second transition edge 462. In one embodiment, the intensity values of profile 707 and 709 are the same less than 25% into transition zone 460, as notated by crossover point 703. In one embodiment, crossover point 703 is closer to second transition edge 462 than first transition edge 461.

By blending the intensity values at the inside and outside boundaries of images 445 and 447 using any of the intensity profiles provided in charts 500, 600, and 700 may allow a more graceful blending of images 445 and 447 by gradually fading from one image into the other. A separate or additional technique in gracefully blending image 445 with image 447 may include applying resolution profiles to the outside boundaries of the image 445.

Figure 8:
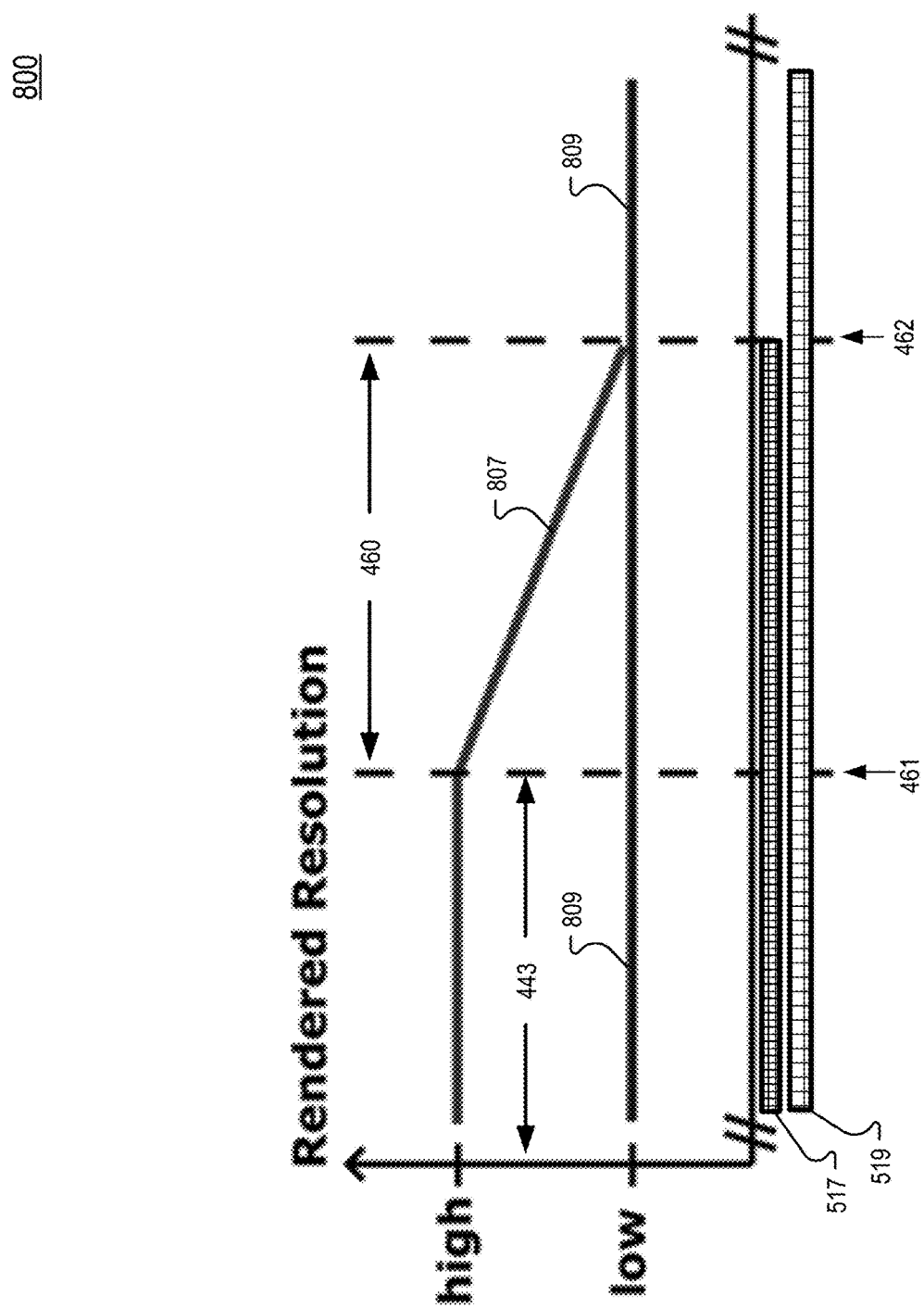
FIG. 8 illustrates an example resolution profile of a first image within a transition zone, in accordance with an embodiment of the disclosure.

FIG. 8 illustrates an example resolution profile of a first image within a transition zone 460, in accordance with embodiments of the disclosure. In embodiments where image 445 is a high-resolution image and the second image is a lower resolution image, a resolution profile may be applied to the outside boundaries of the high-resolution image to gradually blend the resolution of the first image 445 with the second image 447. In chart 800, first resolution profile 807 may be applied to the first image 445 and the second image 447 may retain its lower resolution indicated by baseline resolution 809. In chart 800, first resolution profile 807 linearly decreases a rendered resolution of the first image within the transition zone 460 until the resolution of the first image 445 matches the resolution of the second image 447 at second transition edge 462. To decrease the resolution of image 445, multiple pixels may be grouped together and be driven with a same pixel value to simulate a single lower resolution pixel. As first resolution profile 807 moves toward second transition edge 462, more and more pixels may be grouped together to simulate larger lower resolution pixels until the grouped pixels are the same size or roughly the same size as pixels in the lower resolution image 447.

Figure 9:
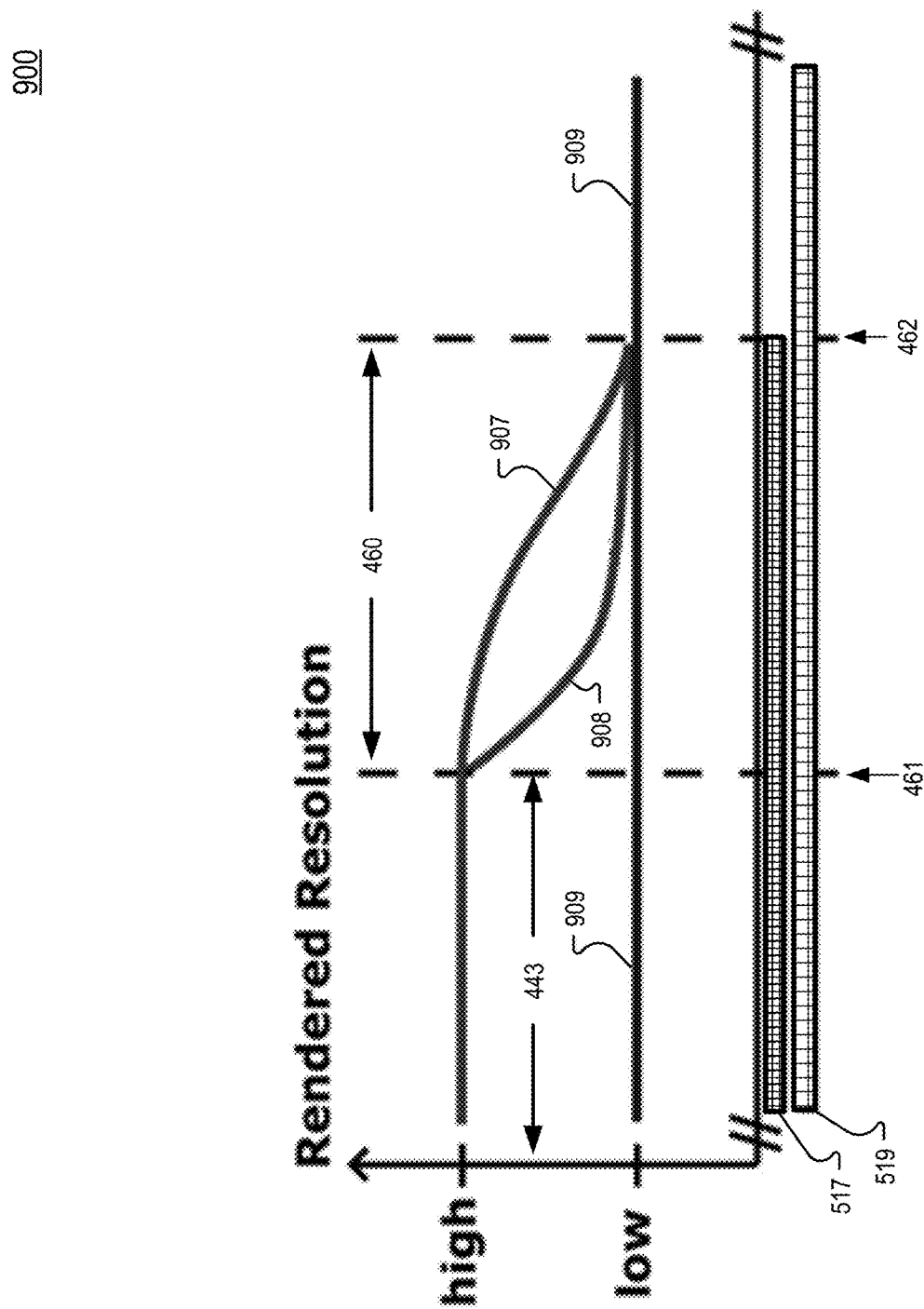
FIG. 9 illustrates example non-linear resolution profiles of a first image within a transition zone, in accordance with an embodiment of the disclosure.

FIG. 9 illustrates example non-linear resolution profiles of a first image within a transition zone 460, in accordance with embodiments of the disclosure. In FIG. 9, baseline resolution 909 is the same as baseline resolution 809. In chart 900, resolution profiles 907 and 908 are non-linear compared to resolution profile 807. Resolution profile 908 is a high frequency resolution profile where the spatial frequency of perceived pixels (pixels grouped together to be perceived as a single pixel) in the rendered image 445 quickly drops off to the lower resolution of baseline resolution 909. In the illustrated resolution profile 908, 25% into the transition zone 460, the rendered resolution of image 445 is closer to the resolution of the second image represented by baseline resolution 909. Resolution profile 907 is a mid frequency resolution profile where the spatial frequency of perceived pixels in the rendered image 445 rolls off gradually to eventually be the same as the lower resolution of baseline resolution 909.

In embodiments of the disclosure, the intensity profiles of charts 500, 600, and 700 may be utilized with the resolution profiles of charts 800 and 900 in any manner to gracefully blend the images 445 and 447 into a combined image 450.

Figure 11:
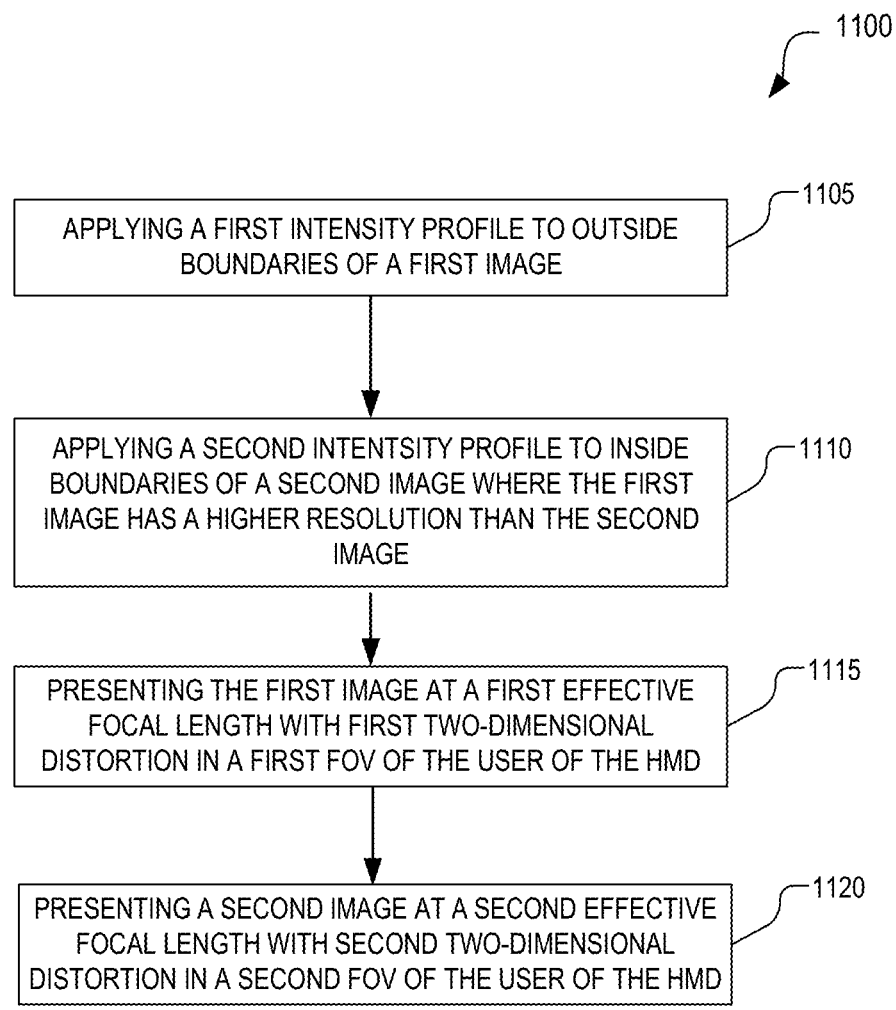
FIG. 11 illustrates a flow chart for an example process of presenting a combined image to a user of an HMD, in accordance with an embodiment of the disclosure.

FIG. 11 illustrates a flow chart for an example process 1100 of presenting a combined image to a user of an HMD, in accordance with an embodiment of the disclosure. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel.

In process block 1105, a first intensity profile is applied to outside boundaries (e.g. 471) of a first image (e.g. image 445). The intensity profiles 507, 607, or 707 may be used as the first intensity profile, for example.

In process block 1110, a second intensity profile (e.g. 509, 609, or 709) is applied to inside boundaries (e.g. 473) of a second image (e.g. 447) where the first image has a higher resolution than the second image.

In process block 1115, the first image is presented to a user of the HMD at a first effective focal length with first two-dimensional distortion in a first field of view. Presenting the first image with a first two-dimensional distortion may include applying a two-dimensional distortion profile that is specific to the optical path and optical elements that the first image encounters prior to becoming incident on the eye 202. For example, in FIG. 2, the first two-dimensional distortion would account for the optical path when optical assembly 230 is driven to the first focal length. In FIG. 3, the first two-dimensional distortion would account for the optical path through optical assembly 311 (if included), reflective element 330, and optical assembly 340. The first two-dimensional distortion profile may include barrel distortion, pincushion distortion, mustache distortion, trapezoidal distortion, or otherwise to account for optical aberrations imparted by the optical path. The first two-dimensional distortion profile may account for adjusting for scale or applying other deformations to the first image to account for non-linear pupil swim effects. The first two-dimensional distortion profile may be determined by a calibration procedure. The first two-dimensional distortion profile may be stored in memory 295/395.

In process block 1120, the second image is presented at a second effective focal length with second two-dimensional distortion in a second field of view to the user of the HMD. Presenting the second image with second two-dimensional distortion may include applying a two-dimensional distortion profile that is specific to the optical path and optical elements that the second image encounters prior to becoming incident on the eye 202. For example, in FIG. 2, the second two-dimensional distortion would account for the optical path when optical assembly 230 is driven to the second focal length. In FIG. 3, the second two-dimensional distortion would account for the optical path through optical assembly 321 (if included) and optical assembly 340. The second two-dimensional distortion profile may include barrel distortion, pincushion distortion, mustache distortion, or otherwise to account for optical aberrations imparted by the optical path. The second two-dimensional distortion profile may account for adjusting for scale or applying other deformations to the second image to account for non-linear pupil swim effects. The second two-dimensional distortion profile may be determined by a calibration procedure. The second two-dimensional distortion profile may be stored in memory 295/395.

In process 1100, the second field of view may be larger than the second field of view. The first effective focal length may be longer than the second effective focal length. The first image and the second image are presented within a time period that allows the user to perceive the first image and the second image as a combined image (e.g. image 450). Process block 1115 and process block 1120 may be executed simultaneously, in some embodiments.

In one embodiment, process 1100 further includes applying a first resolution profile (e.g. 807, 907, or 908) to the outside boundaries of the first image where the first resolution profile decreases a rendered resolution of the first image in a first transition zone (e.g. 471) of the first image. In some embodiments, the first resolution profile decreases the rendered resolution linearly between the first image and the second image. In some embodiments, 25% into the first transition zone, the rendered resolution is closer to a resolution of the second image than the first image.

In some embodiments of process 1100, applying the first intensity profile to the outside boundaries of the first image includes decreasing first pixel intensity values of first pixels in a first transition zone of the first image as the first pixels in the first transition zone get closer to the outside boundaries of the first image and applying the second intensity profile to the inside boundaries of the second image includes decreasing second pixel intensity values of second pixels in a second transition zone of the second image as the second pixels in the second transition zone get closer to the inside boundaries of the second image. In one embodiment, the first pixel intensity values decrease linearly and the second pixel intensity values decrease linearly. In one embodiment, the first pixel intensity values decrease non-linearly and the second pixel intensity values decrease non-linearly.

The techniques described in connection with FIGS. 4A-9 and process 1100 of FIG. 11 may assist in gracefully blending a first image with a second image. In some display systems it may also be useful to address misalignments from discontinuities and shearing between two blended images using eye-tracking information. As the eye moves, the chief ray of the display system may move where it encounters the display. Therefore, the images may need to move and distort on the display (or displays) in order to match the modified chief ray intersections with the display(s). In some contexts, process 1100 may be used in conjunction with process 1200 of FIG. 12.

FIG. 12 illustrates a flow chart for an example process 1200 of presenting a combined image to a user of an HMD based at least in part on eye-tracking, in accordance with an embodiment of the disclosure. The order in which some or all of the process blocks appear in process 1200 should not be deemed limiting. Rather, one of ordinary skill in the art having the benefit of the present disclosure will understand that some of the process blocks may be executed in a variety of orders not illustrated, or even in parallel. The process blocks of FIG. 12 may be executed by combining logic 297 of FIG. 2 or combining logic 397 of FIG. 3, in some embodiments.

In process block 1205, a pupil position of an eye of a user of an HMD is determined. The pupil position of eye 202 may be determined by way of eye-tracking system 273, for example.

In process block 1210, a first position and first two-dimensional distortion of a first image are adjusted based at least in part on the determined pupil position. The first position of the first image may be adjusted by driving the first image at a different position of a display pixel array, for example. The two-dimensional distortion applied to the first image when the pupil is gazing "on-axis" will be different from the two-dimensional distortion that is applied when the pupil is gazing "off-axis," for example. The two-dimensional distortion that is applied may vary based on how far off-axis the pupil is gazing and in what direction. A two-dimensional distortion profile to apply as the first two-dimensional distortion may be determined from a lookup table that corresponds to the pupil position with a particular two-dimensional distortion profile. The two-dimensional distortion profile may be similar to the two-dimensional distortion described with respect to process block 1115.

Referring to FIG. 10A, display pixel array 1010 may drive a first image 1019 onto display pixel array 1010. First image 1019 may correspond to a display system where a first FOV of a user to view image 1019 is "lens-limited" by an optical assembly such as optical assembly 230 or 340. Display pixel array 1020 may drive a second image 1029 having a void portion 1043 of black pixel values onto display pixel array 1020. Display pixel array 1010 may be of a higher resolution than display pixel array 1020. Display pixel array 1010 may be included in display 310 and display pixel array 1020 may be included in display 320. Second image 1029 may correspond to a display system where a second FOV of a user to view image 1029 is "lens-limited" by an optical assembly such as optical assembly 230 or 340. The positions of images 1019 and 1029 may represent the correct position of the images on the display pixel array when a user is looking through a central optical axis ("on-axis") of the display system 300.

Adjusting a first position of first image 1019 in response to a pupil position may include moving the position of the image 1019 on display pixel array 1010 by moving the image 1019 in one or more directions 1011, 1012, 1013, and/or 1014. Adjusting a second position of second image 1029 in response to a pupil position may include moving the position of the image 1029 on display pixel array 1010 by moving the image 1029 in one or more directions 1021, 1022, 1023, and/or 1024. In some embodiments, image 1029 is not moved in directions 11021, 1022, 1023, and/or 1024 in response to the determined pupil position, but adjusting the second position of second image 1029 includes moving void portion 1043 within image 1029 in response to the pupil position. In FIG. 10B, first image 1019 has been moved in direction 1014 based on a determined pupil position while void portion 1043 of second image 1029 has been moved in direction 1022 in response to the determined pupil position. Void portion 1043 has been moved so that image 1019 will align within void portion 1043. In one embodiment, adjusting the first position of first image 1019 may include adjusting the two-dimensional distortion and scale of first image 1019. Adjusting the second position of second image 1029 may include adjusting the distortion and scale of second image 1029.

Returning to FIG. 12, in process block 1215, the first image is presented into a first field of view of the user of the HMD. In process block 1220, a second position and a second two-dimensional distortion of the second image are adjusted based at least in part on the determined pupil position so that the first image will align with the second image. The two-dimensional distortion that is applied may vary based on how far off-axis the pupil is gazing and in what direction. A two-dimensional distortion profile to apply as the second two-dimensional distortion may be determined from a lookup table that corresponds to the pupil position with a particular two-dimensional distortion profile. The two-dimensional distortion profile may be similar to the two-dimensional distortion described with respect to process block 1120.

In process block 1225, the second image is presented into a second field of view of the user and the second image includes a void portion of black pixel values and the first image is presented in a viewing area corresponding to the void portion. Process 1200 may return to process block 1205 after executing process block 1225.

In FIGS. 10A-10E, image 1019 may be sized to fit into a viewing area corresponding to void portion 1043. Image 1019 may be sized to fit into a viewing area that slightly overlaps void portion 1043 in some embodiments. Consequently, when first image 1019 is re-positioned based on a pupil position of eye 202, void portion 1043 may also need to be re-positioned so that the image features of 1029 align with the image features of image 1019 and that the correct pixels are driven to black pixel values in void portion 1043.

Furthermore, a transition zone that assists in blending images 1019 and 1029 may be adjusted based on a determined pupil position. FIGS. 10C-10E and FIGS. 13A-13C illustrate one example of adjusting the transition zone for blending the two images in response to a determined pupil position.

Figure 10C:
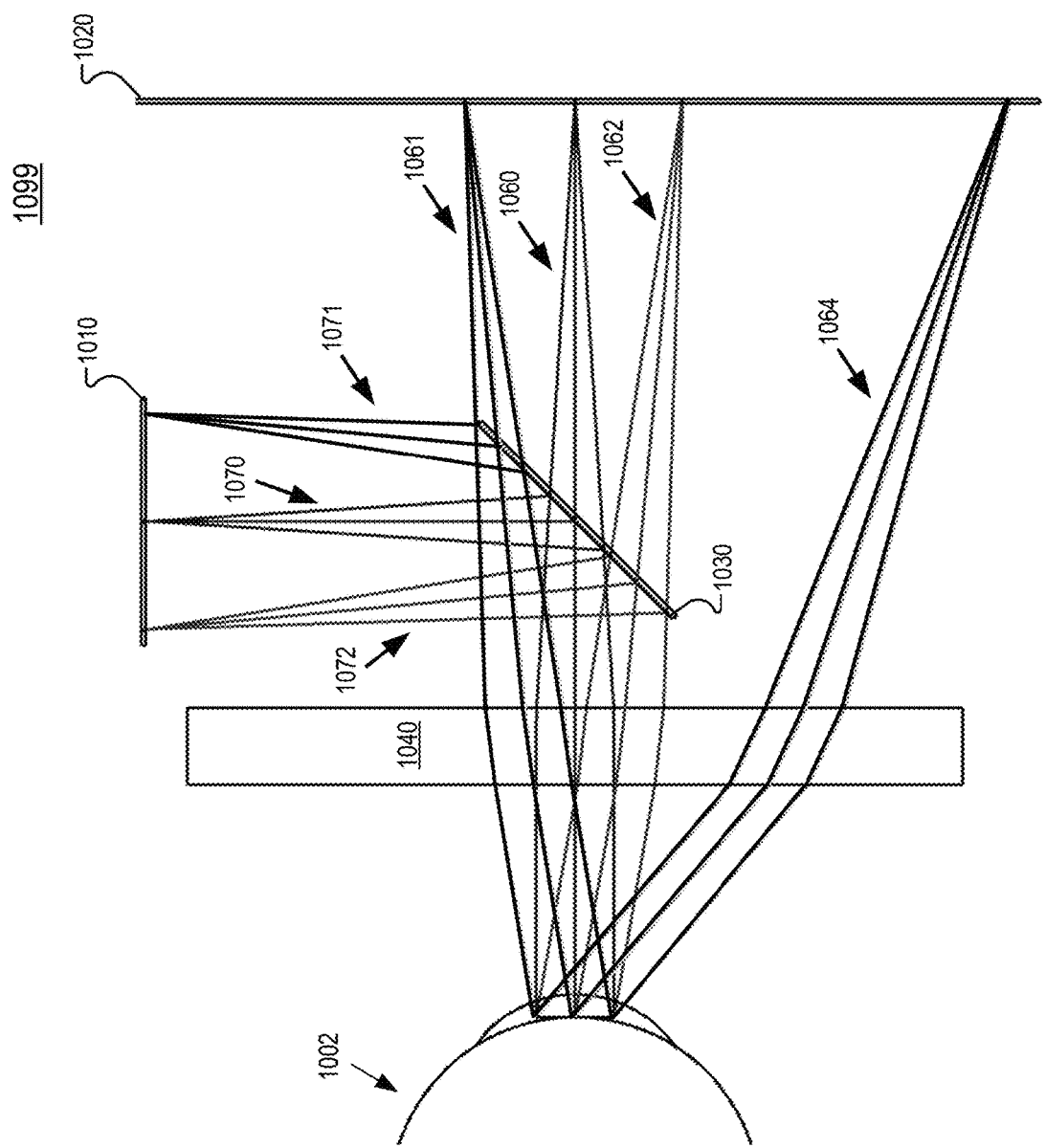

FIG. 10C illustrates a display system 1099 arranged similarly to display system 300 of FIG. 3. Display system 1099 includes display pixel array 1010, display pixel array 1020, reflective element 1030, and optical assembly 1040. In FIG. 10C, eye 1002 is gazing straight ahead and "on-axis." Rays 1070, 1071, and 1072 show the optical path to display pixel array 1010 while rays 1060, 1061, 1062, and 1064 show the optical path to display pixel array 1020.

Figure 13A:
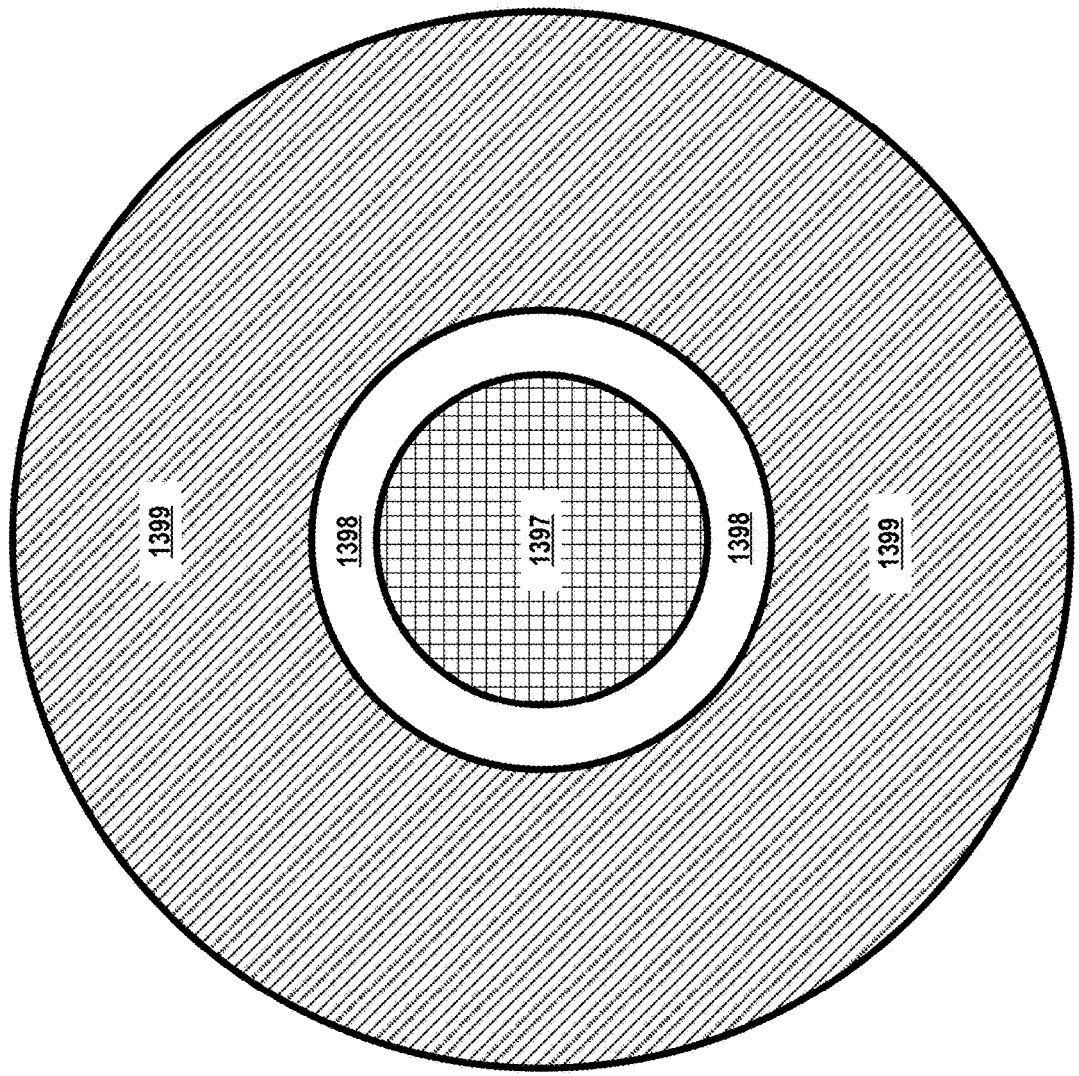
FIGS. 13A-13C illustrates example viewing regions seen by a viewer, in accordance with an embodiment of the disclosure.

FIG. 13A illustrates viewing regions 1397, 1398, and 1399 that may be viewable to a user when eye 1002 is gazing "on-axis" in display system 1099. Viewing region 1397 may include display light from image 1019. Viewing region 1398 may include display light from both first transition zone 1027 and second transition zone 1037. Viewing region 1399 may include display light from image 1029.

Figure 10D:
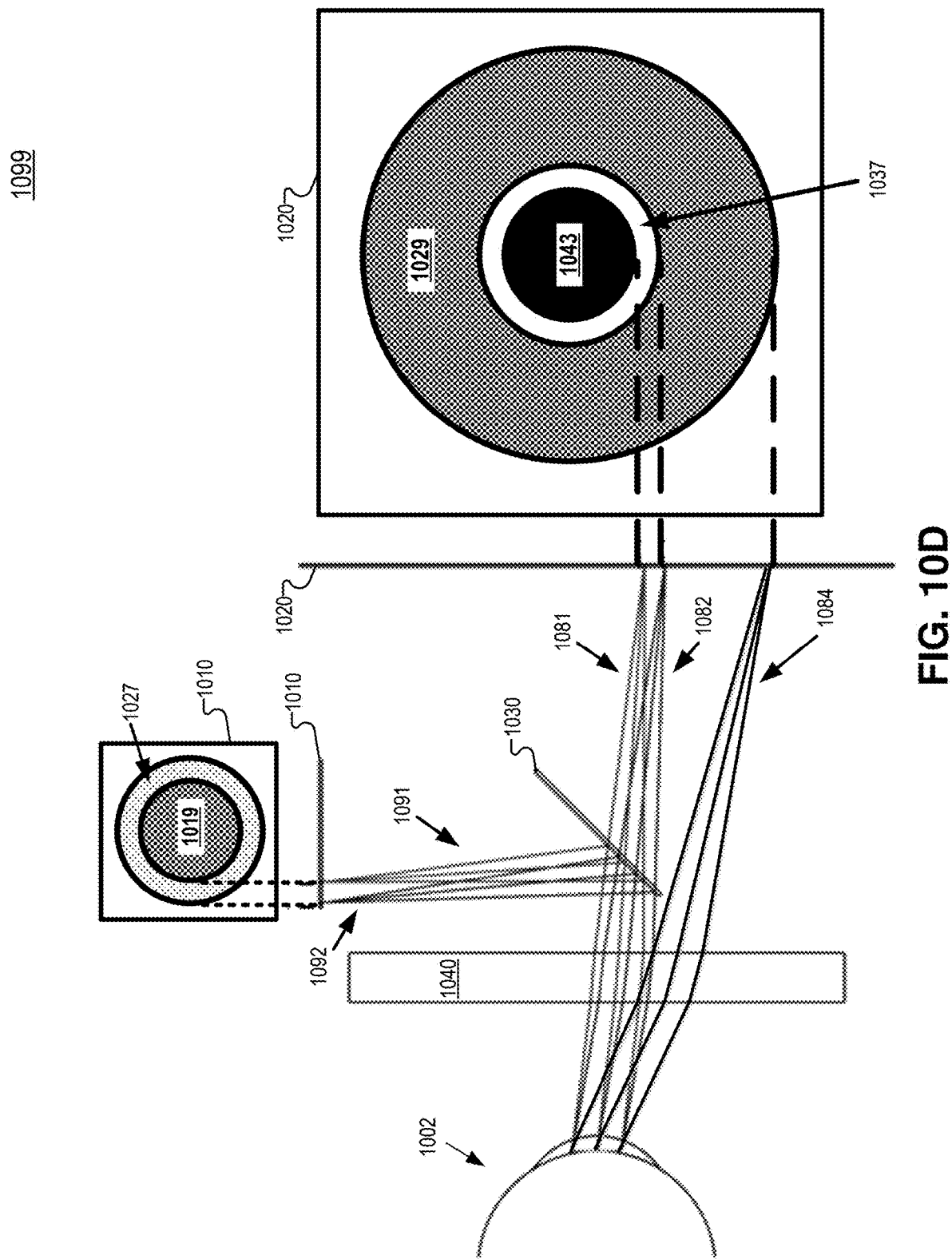

FIG. 10D illustrates display system 1099 along with the viewing regions of the images driven onto display pixel array 1010 and 1020. FIG. 10D includes rays 1081, 1082, and 1084 showing the optical path to display pixel array 1020 and rays 1091 and 1092 showing the optical path to display pixel array 1010. Rays 1091 and 1092 correspond with the edges of first transition zone 1027. Rays 1081 and 1082 correspond with edges of second transition zone 1037. In FIG. 10D, eye 1002 is still looking "on-axis," as in FIG. 10C. The techniques described in connection with FIGS. 4A-9 and process 1100 of FIG. 11 may be used in first transition zone 1027 and second transition zone 1037. Rays 1084 correspond with the outer boundary of image 1029.

Figure 10E:
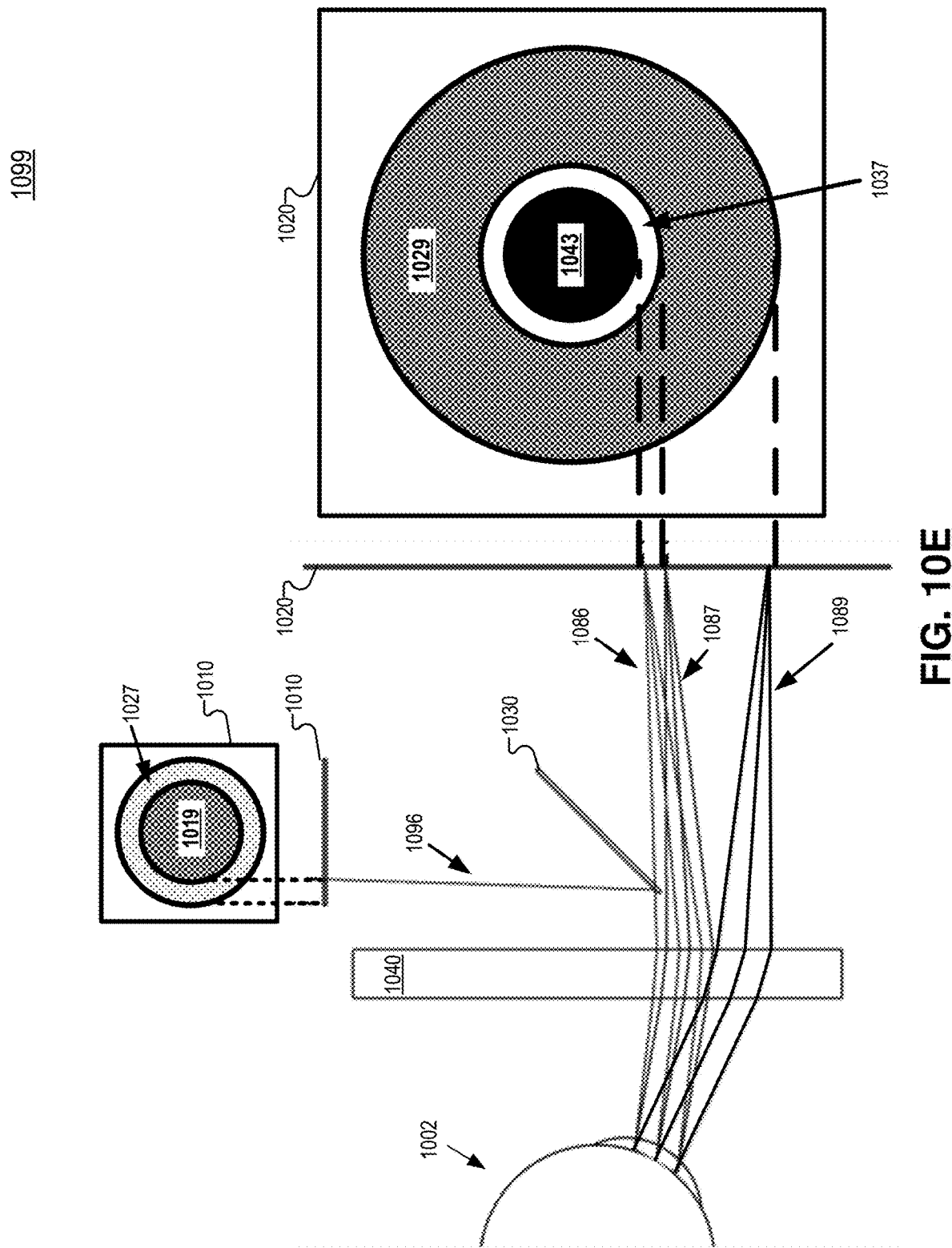

FIG. 10E illustrates eye 1002 gazing downward. Rays 1086 and 1087 correspond to second transition zone 1037 and ray 1096 corresponds to first transition zone 1027. Notably, ray 1096 reflects off of the edge of reflective element 1030. Therefore, an outside edge of first transition zone 1027 may not be viewable to eye 1002.

Figure 13B:
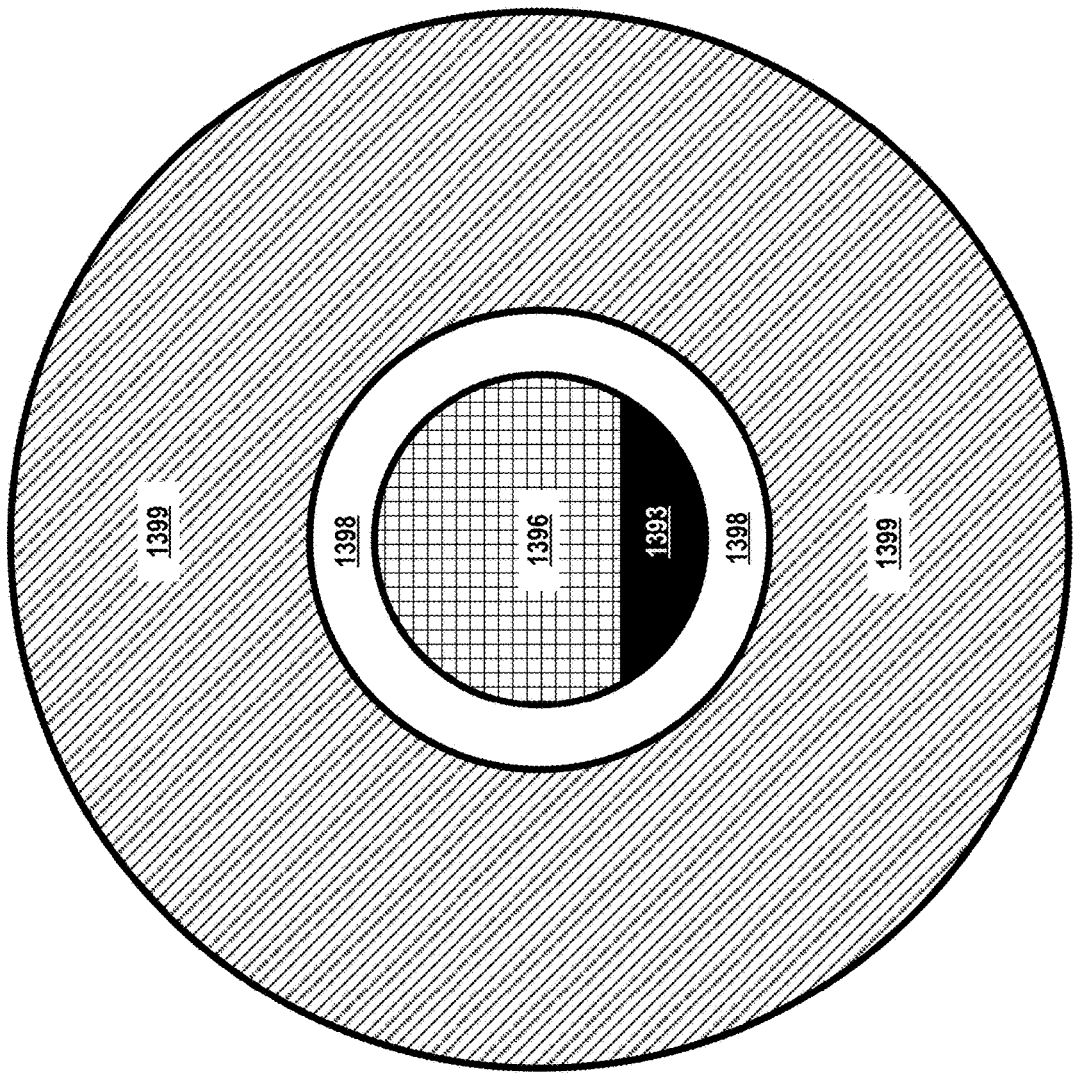
Figure 13C:
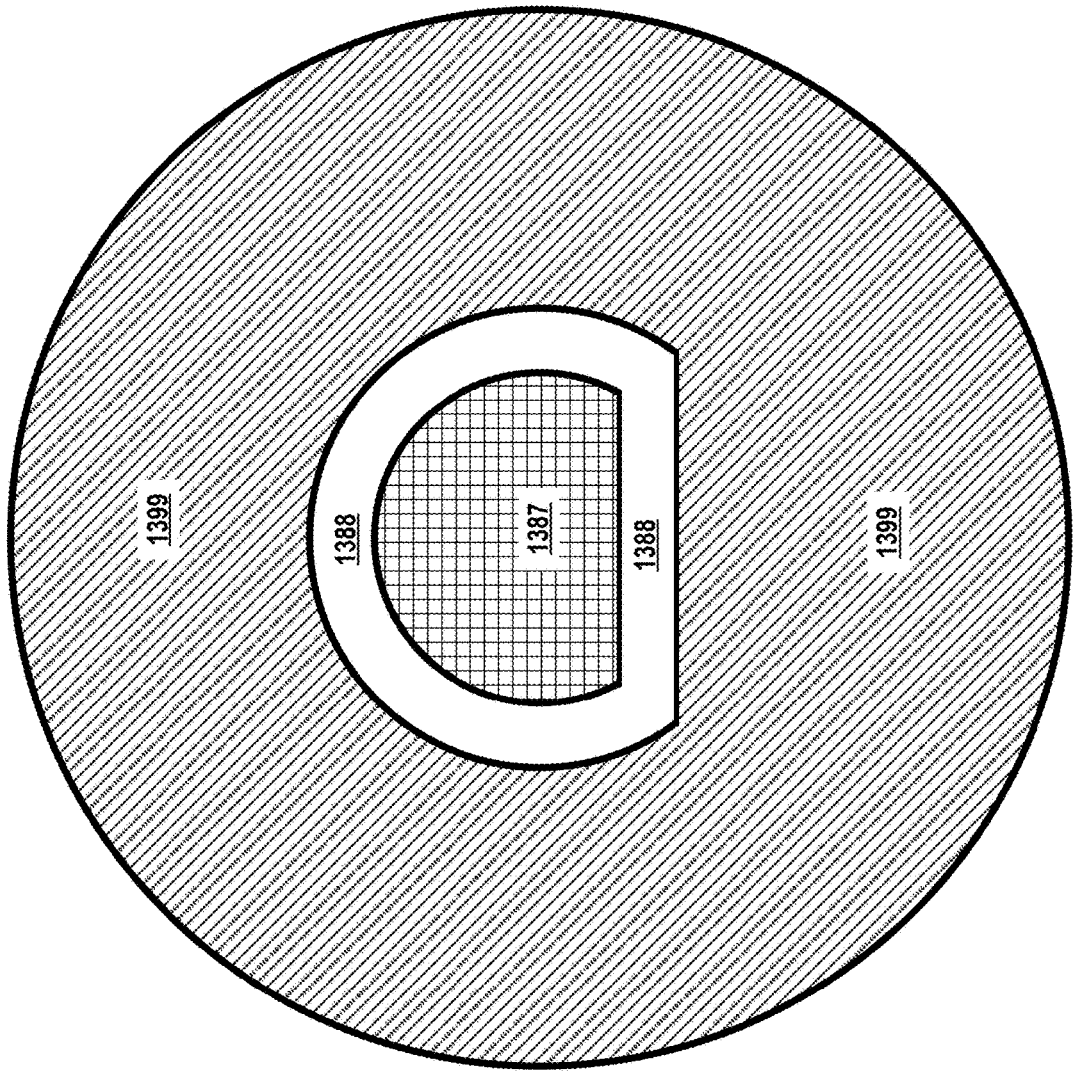

FIG. 13B illustrates viewing regions 1393, 1396, 1398, and 1399 that may be viewable to a user when eye 1002 is gazing downward and off-axis in display system 1099, when there is no correction for pupil position. In FIG. 13B, the user may see dim viewing region 1393 where inset display pixel array 1010 is vignetted and the display pixel array 1020 is driving black pixel values in void portion 1043. To correct for dim viewing regions when a pupil of eye 1002 is de-centered, the first transition zone 1027 and the second transition zone 1037 may have a fully flexible boundary to account for vignetting associated with shifts in pupil position, as shown in FIG. 13C. FIG. 13C illustrates viewing regions 1387, 1388, and 1399 where first transition zone 1027 and second transition zone 1037 have been expanded to reduce or eliminate dim viewing region 1393. In other words, dim viewing region 1393 (where inset display pixel array 1010 was vignetted) is filled in with an inward expansion in second transition zone 1037 so that some of the pixels in the bottom of void 1043 are not driven to black pixel values and the edges of the second transition zone 1037 flattens out instead of continuing as a circle. The edges of transition zone 1027 may also flatten out instead of continuing as a circle so that images 1019 and 1029 are gracefully blended. Hence, the viewing region 1388 may represent the display light received from expanded versions of first transition zone 1027 and second transition zone 1037 when they are corrected for the downward pupil position in FIG. 10E.

In one embodiment of process 1200, adjusting the first position of the first image includes expanding a first transition zone (e.g. 1027) of the first image (e.g. 1019). In one embodiment of process 1200, adjusting the second position of the second image includes expanding a second transition zone (e.g. 1037) of the second image (e.g. 1029) and reducing the void portion of black pixels values in the second image. The void portion of black pixels values in the second image may be reduced by as much as the second transition zone of the second image is expanded inward. In one embodiment, the first transition zone expands inward to be same shape as the second transition zone and cover the same viewing region (e.g. 1388).

Referring back to process block 1210, adjusting the first position of the first image in process block 1210 may also be based at least in part on a first optical path profile characterizing a first optical path between the eye and a display that the first image is driven onto. For example, the optical path for display light emitted by display 310, reflected by reflective element 330 and focused/directed to eye 202 may be characterized in a first optical path profile 298/398 that is accessed by the combining logic 297/397 to determine the position that the image should be driven onto the display 310. Similarly, the optical path for display light emitted by display 320 and focused/directed to eye 202 may be characterized in a second optical path profile 299/399 that is accessed by the combining logic 297/397 to determine the position that the image should be driven onto the display 320. Optical assemblies 230/340 and other optical elements (e.g. 330) may have relatively complicated optical paths that include lensing curvatures, refractive materials, diffractive gratings, polarization layers, waveplates, and other optical elements that may be characterized into the first optical path profile 298/398. The second optical path of display light encountered by the second image may also be relatively complicated and characterized in second optical path profile 299/399 so that the combining logic 297/397 can position the second image into the correct position of the display. Utilizing the first optical path profile 298/299 and second optical path profile 299/399 may be especially important when the first image is presented at a first effective focal length and the second image is presented at a second effective focal length that may be shorter than the first effective focal length. In these embodiments, determining the pupil position of the eye and adjusting the images accordingly assists in correcting for differential pupil swim between the optical paths having different effective focal lengths so that shearing discontinuities between the two images are accounted for.

In the context of the display system of HMD 200 of FIG. 2, a first image (e.g. 445) may be driven onto display 210 and be presented to the user at a first effective focal length when combining logic 297 drives a selectable optical element such as optical assembly 230 to the first effective focal length. A second image (e.g. 447) may be driven onto display 210 and be presented to the user at a second effective focal length when combining logic 297 drives optical assembly 230 to the second effective focal length. The first and second image may be driven onto display 210 in a time-sequential manner at frame rate that is high enough so that the user perceives the first and second image as a combined image. When the second effective focal length is shorter than the first effective focal length, the first image is perceived as a higher resolution inset image since the second image occupies a wider FOV and the first image occupies a narrower FOV. Here again, the optical paths corresponding to the first effective focal length and the second effective focal length may be characterized in first optical path profile 298 and second optical path profile 299, respectively.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "logic" (e.g. 297 and/or 397) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g. 295 and/or 395) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method of presenting a combined image to a user of a head mounted display (HMD), the computer-implemented method comprising:
    applying a first intensity profile to outside boundaries of a first image;
    applying a second intensity profile to inside boundaries of a second image, wherein the first image has a higher resolution than the second image;
    presenting the first image at a first effective focal length with first two-dimensional distortion in a first field of view of the user of the HMD; and
    presenting a second image at a second effective focal length with second two-dimensional distortion in a second field of view of the user of the HMD that is larger than the first field of view, wherein the first effective focal length is longer than the second effective focal length, and wherein the first image and the second image are presented within a time period that allows the user to perceive the first image and the second image as the combined image.

2. The computer-implemented method of claim 1 further comprising:
    applying a first resolution profile to the outside boundaries of the first image, wherein the first resolution profile decreases a rendered resolution of the first image in a first transition zone of the first image.

3. The computer-implemented method of claim 2, wherein the first resolution profile decreases the rendered resolution linearly between the first image and the second image.

4. The computer-implemented method of claim 2, wherein 25% into the first transition zone, the rendered resolution is closer to a resolution of the second image than the first image.

5. The computer-implemented method of claim 1, wherein applying the first intensity profile to the outside boundaries of the first image includes decreasing first pixel intensity values of first pixels in a first transition zone of the first image as the first pixels in the first transition zone get closer to the outside boundaries of the first image,
and wherein applying the second intensity profile to the inside boundaries of the second image includes decreasing second pixel intensity values of second pixels in a second transition zone of the second image as the second pixels in the second transition zone get closer to the inside boundaries of the second image.

6. The computer-implemented method of claim 5, wherein the first pixel intensity values decrease linearly, and wherein the second pixel intensity values decrease linearly.

7. The computer-implemented method of claim 5, wherein the first pixel intensity values decrease non-linearly, and wherein the second pixel intensity values decrease non-linearly.

8. A computer-implemented method of presenting a combined image to a user of a head mounted display (HMD), the method comprising:
determining a pupil position of an eye of the user of the HMD;
adjusting a first position and a first two-dimensional distortion of a first image based at least in part on the determined pupil position;
presenting the first image into a first field of view of the user;
adjusting a second position and second two-dimensional distortion of a second image based at least in part on the determined pupil position so that the first image will align with the second image; and
presenting the second image into a second field of view of the user, wherein the second image includes a void portion of black pixel values and the first image is presented in a viewing area corresponding to the void portion.

9. The computer-implemented method of claim 8, wherein the first image is of higher resolution than the second image.

10. The computer-implemented method of claim 8, wherein adjusting the first position and the first two-dimensional distortion of the first image is also based at least in part on a first optical path profile characterizing a first optical path between the eye and a display that the first image is driven onto.

11. The computer-implemented method of claim 8, wherein adjusting the second position and the second two-dimensional distortion of the second image is also based at least in part on a second optical path profile characterizing a second optical path between the eye and a display that the second image is driven onto.

12. The computer-implemented method of claim 8, wherein the first image is presented at a first effective focal length and the second image is presented at a second effective focal length shorter than the first effective focal length.

13. The computer-implemented method of claim 12, wherein the first image is driven onto a display and the second image is driven onto the display, and wherein a selectable optical element configured to adjust between the first effective focal length and the second effective focal length is disposed between the eye and the display, the computer-implemented method of claim 12 further comprising:
driving the selectable optical element to the first effective focal length while the first image is driven onto the display; and
driving the selectable optical element to the second effective focal length while the second image is driven onto the display.

14. The computer-implemented method of claim 8, wherein the first image is presented onto a first display and the second image is driven onto a second display, wherein the first display has a higher resolution than the second display.

15. The computer-implemented method of claim 8, wherein presenting the second image into the second field of view includes driving a void portion of display pixels to a black pixel value, wherein the first image is presented in a viewing area corresponding to the void portion of display pixels driven to the black pixel value.

16. The computer-implemented method of claim 8, wherein determining the pupil position of the eye includes capturing images of the eye with an eye-tracking camera included in a head mounted display (HMD).

17. The computer-implemented method of claim 8, wherein adjusting the first position of the first image includes expanding inward a first transition zone of the first image.

18. The computer-implemented method of claim 8, wherein adjusting the second position of the second image includes:
expanding inward a second transition zone of the second image; and
reducing the void portion of black pixels values in the second image.

19. The computer-implemented method of claim 18, wherein the void portion of black pixels values in the second image is reduced by as much as the second transition zone of the second image is expanded inward.

20. A head mounted display (HMD) comprising:
an eye-tracking system configured to determine a pupil position of an eye of a user of the HMD;
at least one display to present images to the eye of the user;
an optical assembly to focus image light for the eye of the user;
combining logic configured to receive the pupil position from the eye-tracking system; and
a computer readable medium communicatively coupled to the combining logic, wherein the computer readable medium includes instructions, that when executed by the combining logic, cause the HMD to perform operations comprising:
determining the pupil position of the eye of the user of the HMD, wherein determining the pupil position includes capturing images of the eye with a camera of the eye-tracking system;
adjusting a first position of a first image based at least in part on the determined pupil position;
presenting the first image into a first field of view of the user;

adjusting a second position of a second image based at least in part on the determined pupil position so that the first image will align with the second image; and presenting the second image into a second field of view of the user.

\* \* \* \* \*